(12) United States Patent
Patiejunas et al.

(10) Patent No.: US 10,698,880 B2
(45) Date of Patent: *Jun. 30, 2020

(54) DATA STORAGE APPLICATION PROGRAMMING INTERFACE

(71) Applicant: Amazon Technologies, Inc., Seattle, WA (US)

(72) Inventors: Kestutis Patiejunas, Sammamish, WA (US); Christian L. Claiborn, Seattle, WA (US); Colin L. Lazier, Seattle, WA (US); Claire E. Suver Weir, Seattle, WA (US); Mark C. Seigle, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/973,715

(22) Filed: Dec. 17, 2015

(65) Prior Publication Data

US 2016/0103870 A1    Apr. 14, 2016

Related U.S. Application Data

(63) Continuation of application No. 13/570,074, filed on Aug. 8, 2012, now Pat. No. 9,225,675.

(51) Int. Cl.
*G06F 16/23*    (2019.01)
*H04L 12/58*    (2006.01)
(Continued)

(52) U.S. Cl.
CPC .......... *G06F 16/2365* (2019.01); *G06F 11/14* (2013.01); *G06F 16/00* (2019.01);
(Continued)

(58) Field of Classification Search
CPC ................ H04L 51/24; G06F 17/30
See application file for complete search history.

(56) References Cited

U.S. PATENT DOCUMENTS

| 5,239,640 A | 8/1993 | Froemke et al. |
| 5,506,809 A | 4/1996 | Csoppenszky et al. |

(Continued)

FOREIGN PATENT DOCUMENTS

| CN | 1487451 A | 4/2004 |
| CN | 1534949 A | 10/2004 |

(Continued)

OTHER PUBLICATIONS

Advanced Computer & Network Corporation, "RAID Level 5: Independent Data Disks With Distributed Parity Blocks", May 12, 2011, retrieved from https://web.archive.org/web/20110512213916/http://www.acnc.com/raidedu/5, 2 pages.

(Continued)

*Primary Examiner* — David R Lazaro
*Assistant Examiner* — Zia Khurshid
(74) *Attorney, Agent, or Firm* — Davis Wright Tremaine LLP

(57) ABSTRACT

An application programming interface for a data storage service provides a convenient mechanism for clients of the data storage service to access its various capabilities. An API call may be made to initiate a job and in response a job identifier may be provided. A separate API call specifying the job identifier may be made and a response providing information related to the job may result. Various API calls may be used to store data, retrieve data, obtain an inventory of stored data, and to obtain other information relating to stored data.

21 Claims, 16 Drawing Sheets

(51) Int. Cl.
*G06F 16/00* (2019.01)
*G06F 16/21* (2019.01)
*G06F 16/17* (2019.01)
*G06F 11/14* (2006.01)

(52) U.S. Cl.
CPC ........ *G06F 16/1734* (2019.01); *G06F 16/219* (2019.01); *H04L 51/24* (2013.01); *G06F 11/1443* (2013.01); *G06F 11/1464* (2013.01)

(56) References Cited

U.S. PATENT DOCUMENTS

| | | |
|---|---|---|
| 5,586,291 A | 12/1996 | Lasker et al. |
| 5,701,407 A | 12/1997 | Matsumoto et al. |
| 5,737,745 A | 4/1998 | Matsumoto et al. |
| 5,751,997 A | 5/1998 | Kullick et al. |
| 5,900,007 A | 5/1999 | Nunnelley et al. |
| 6,023,710 A | 2/2000 | Steiner et al. |
| 6,138,126 A | 10/2000 | Hitz |
| 6,208,999 B1 | 3/2001 | Spilo et al. |
| 6,374,264 B1 | 4/2002 | Bohannon et al. |
| 6,543,029 B1 | 4/2003 | Sandorfi |
| 6,578,127 B1 | 6/2003 | Sinclair |
| 6,604,224 B1 | 8/2003 | Armstrong et al. |
| 6,606,629 B1 | 8/2003 | DeKoning et al. |
| 6,747,825 B1 | 6/2004 | Ng et al. |
| 6,768,863 B2 | 7/2004 | Ando et al. |
| 6,775,831 B1 | 8/2004 | Carrasco et al. |
| 6,950,967 B1 | 9/2005 | Brunnett et al. |
| 6,959,326 B1 | 10/2005 | Day et al. |
| 7,076,604 B1 | 7/2006 | Thelin |
| 7,120,737 B1 | 10/2006 | Thelin |
| 7,155,713 B1 | 12/2006 | Burkhardt et al. |
| 7,269,733 B1 | 9/2007 | O'Toole |
| 7,310,801 B2 | 12/2007 | Burkhardt et al. |
| 7,340,490 B2 | 3/2008 | Teloh et al. |
| 7,409,495 B1 | 8/2008 | Kekre et al. |
| 7,487,316 B1 | 2/2009 | Hall et al. |
| 7,487,385 B2 | 2/2009 | Rodrigues et al. |
| 7,577,689 B1 | 8/2009 | Masinter et al. |
| 7,644,061 B1 | 1/2010 | Fallis et al. |
| 7,685,309 B2 | 3/2010 | Caronni et al. |
| 7,730,071 B2 | 6/2010 | Iwasaki et al. |
| 7,774,466 B2 | 8/2010 | Coates et al. |
| 7,783,600 B1 | 8/2010 | Spertus et al. |
| 7,814,078 B1 | 10/2010 | Forman et al. |
| 7,827,201 B1 | 11/2010 | Gordon et al. |
| 7,840,878 B1 | 11/2010 | Tang et al. |
| 7,860,825 B2 | 12/2010 | Chatterjee et al. |
| 7,929,551 B2 | 4/2011 | Dietrich et al. |
| 7,937,369 B1 | 5/2011 | Dings et al. |
| 8,006,125 B1 | 8/2011 | Meng et al. |
| 8,015,158 B1 | 9/2011 | Mankovsky et al. |
| 8,019,925 B1 | 9/2011 | Vogan et al. |
| 8,041,677 B2 | 10/2011 | Sumner et al. |
| 8,051,052 B2 | 11/2011 | Jogand-Coulomb et al. |
| 8,060,473 B1 | 11/2011 | Dhumale et al. |
| 8,108,686 B2 | 1/2012 | Dik et al. |
| 8,130,554 B1 | 3/2012 | Linnell |
| 8,140,843 B2 | 3/2012 | Holtzman et al. |
| 8,156,381 B2 | 4/2012 | Tamura et al. |
| 8,161,292 B2 | 4/2012 | Carbone |
| 8,204,969 B2 | 6/2012 | Carcerano et al. |
| 8,245,031 B2 | 8/2012 | Holtzman et al. |
| 8,266,691 B2 | 9/2012 | Zvi |
| 8,266,711 B2 | 9/2012 | Holtzman et al. |
| 8,291,170 B1 | 10/2012 | Zhang et al. |
| 8,296,410 B1 | 10/2012 | Myhill et al. |
| 8,336,043 B2 | 12/2012 | Lavery et al. |
| 8,352,430 B1 | 1/2013 | Myhill et al. |
| 8,352,439 B1 | 1/2013 | Lee et al. |
| 8,370,315 B1 | 2/2013 | Efstathopoulos et al. |
| 8,464,133 B2 | 6/2013 | Grube et al. |
| 8,473,816 B2 | 6/2013 | Zvibel |
| 8,554,918 B1 | 10/2013 | Douglis |
| 8,595,596 B2 | 11/2013 | Grube et al. |
| 8,620,870 B2 | 12/2013 | Dwarampudi et al. |
| 8,671,076 B2 | 3/2014 | Price et al. |
| 8,699,159 B1 | 4/2014 | Malina |
| 8,806,502 B2 | 8/2014 | Gargash et al. |
| 8,838,911 B1 | 9/2014 | Hubin et al. |
| 8,898,114 B1 | 11/2014 | Feathergill et al. |
| 8,959,067 B1 | 2/2015 | Patiejunas et al. |
| 8,972,677 B1 | 3/2015 | Jones |
| 8,990,215 B1 | 3/2015 | Reztlaff, II et al. |
| 9,047,306 B1 | 6/2015 | Frolund et al. |
| 9,053,212 B2 | 6/2015 | Beckey et al. |
| 9,372,854 B2 | 6/2016 | Gold et al. |
| 2002/0055942 A1 | 5/2002 | Reynolds |
| 2002/0091903 A1 | 7/2002 | Mizuno |
| 2002/0103815 A1 | 8/2002 | Duvillier et al. |
| 2002/0122203 A1 | 9/2002 | Matsuda |
| 2002/0161972 A1 | 10/2002 | Talagala et al. |
| 2002/0186844 A1 | 12/2002 | Levy et al. |
| 2003/0033308 A1 | 2/2003 | Patel et al. |
| 2003/0145213 A1 | 7/2003 | Carbone |
| 2003/0149717 A1 | 8/2003 | Heinzman |
| 2004/0003272 A1 | 1/2004 | Bantz et al. |
| 2004/0098565 A1 | 5/2004 | Rohlman et al. |
| 2004/0243737 A1 | 12/2004 | Beardsley et al. |
| 2005/0050342 A1 | 3/2005 | Boivie et al. |
| 2005/0114338 A1 | 5/2005 | Borthakur et al. |
| 2005/0160427 A1 | 7/2005 | Ustaris |
| 2005/0187897 A1 | 8/2005 | Pawar et al. |
| 2005/0203976 A1 | 9/2005 | Hyun et al. |
| 2005/0262378 A1 | 11/2005 | Sleeman et al. |
| 2005/0267935 A1 | 12/2005 | Gandhi et al. |
| 2006/0005074 A1 | 1/2006 | Yanai et al. |
| 2006/0015529 A1 | 1/2006 | Yagawa |
| 2006/0020594 A1 | 1/2006 | Garg et al. |
| 2006/0095741 A1 | 5/2006 | Asher et al. |
| 2006/0107266 A1 | 5/2006 | Martin et al. |
| 2006/0190510 A1 | 8/2006 | Gabryjelski et al. |
| 2006/0242064 A1 | 10/2006 | Jogand-Coulomb et al. |
| 2006/0242065 A1 | 10/2006 | Jogand-Coulomb et al. |
| 2006/0242066 A1 | 10/2006 | Jogand-Coulomb et al. |
| 2006/0242067 A1 | 10/2006 | Jogand-Coulomb et al. |
| 2006/0242068 A1 | 10/2006 | Jogand-Coulomb et al. |
| 2006/0242150 A1 | 10/2006 | Jogand-Coulomb et al. |
| 2006/0242151 A1 | 10/2006 | Jogand-Coulomb et al. |
| 2006/0272023 A1 | 11/2006 | Schmeidler et al. |
| 2007/0011472 A1 | 1/2007 | Cheng |
| 2007/0043667 A1 | 2/2007 | Qawami et al. |
| 2007/0050479 A1 | 3/2007 | Yoneda |
| 2007/0056042 A1 | 3/2007 | Qawami et al. |
| 2007/0079087 A1 | 4/2007 | Wang et al. |
| 2007/0101095 A1 | 5/2007 | Gorobets |
| 2007/0156842 A1 | 7/2007 | Vermeulen et al. |
| 2007/0168292 A1 | 7/2007 | Jogand-Coulomb et al. |
| 2007/0174362 A1 | 7/2007 | Pham et al. |
| 2007/0198789 A1 | 8/2007 | Clark et al. |
| 2007/0250674 A1 | 10/2007 | Fineberg et al. |
| 2007/0266037 A1 | 11/2007 | Terry et al. |
| 2007/0282969 A1 | 12/2007 | Dietrich et al. |
| 2007/0283046 A1 | 12/2007 | Dietrich et al. |
| 2008/0010449 A1 | 1/2008 | Holtzman et al. |
| 2008/0010450 A1 | 1/2008 | Holtzman et al. |
| 2008/0010451 A1 | 1/2008 | Holtzman et al. |
| 2008/0010452 A1 | 1/2008 | Holtzman et al. |
| 2008/0010455 A1 | 1/2008 | Holtzman et al. |
| 2008/0010458 A1 | 1/2008 | Holtzman et al. |
| 2008/0010685 A1 | 1/2008 | Holtzman et al. |
| 2008/0022395 A1 | 1/2008 | Holtzman et al. |
| 2008/0022413 A1 | 1/2008 | Holtzman et al. |
| 2008/0034440 A1 | 2/2008 | Holtzman et al. |
| 2008/0059483 A1 | 3/2008 | Williams et al. |
| 2008/0068899 A1 | 3/2008 | Ogihara et al. |
| 2008/0109478 A1 | 5/2008 | Wada et al. |
| 2008/0120164 A1 | 5/2008 | Hassler |
| 2008/0168108 A1 | 7/2008 | Molaro et al. |
| 2008/0177697 A1 | 7/2008 | Barsness et al. |
| 2008/0201707 A1 | 8/2008 | Lavery et al. |
| 2008/0212225 A1 | 9/2008 | Ito et al. |
| 2008/0235485 A1 | 9/2008 | Haertel et al. |

(56) References Cited

U.S. PATENT DOCUMENTS

| | | |
|---|---|---|
| 2008/0256631 A1 | 10/2008 | Zvi |
| 2008/0285366 A1 | 11/2008 | Fujiwara |
| 2008/0294764 A1 | 11/2008 | Wakako |
| 2009/0013123 A1 | 1/2009 | Hsieh |
| 2009/0070537 A1 | 3/2009 | Cho |
| 2009/0083476 A1 | 3/2009 | Pua et al. |
| 2009/0113167 A1 | 4/2009 | Camble et al. |
| 2009/0132676 A1 | 5/2009 | Tu et al. |
| 2009/0150641 A1 | 6/2009 | Flynn et al. |
| 2009/0157700 A1 | 6/2009 | Van Vugt |
| 2009/0164506 A1 | 6/2009 | Barley et al. |
| 2009/0187768 A1 | 7/2009 | Carbone |
| 2009/0193223 A1 | 7/2009 | Saliba et al. |
| 2009/0198736 A1 | 8/2009 | Shen et al. |
| 2009/0198889 A1 | 8/2009 | Ito et al. |
| 2009/0213487 A1 | 8/2009 | Luan et al. |
| 2009/0234883 A1 | 9/2009 | Hurst et al. |
| 2009/0240750 A1 | 9/2009 | Seo |
| 2009/0254572 A1 | 10/2009 | Redlich et al. |
| 2009/0265568 A1 | 10/2009 | Jackson |
| 2009/0300403 A1 | 12/2009 | Little |
| 2010/0017446 A1 | 1/2010 | Choi et al. |
| 2010/0037056 A1 | 2/2010 | Follis et al. |
| 2010/0037216 A1 | 2/2010 | Carcerano et al. |
| 2010/0070775 A1 | 3/2010 | Dik et al. |
| 2010/0077214 A1 | 3/2010 | Jogand-Coulomb et al. |
| 2010/0088496 A1 | 4/2010 | Zolnowsky et al. |
| 2010/0094819 A1 | 4/2010 | Bornhoevd et al. |
| 2010/0131411 A1 | 5/2010 | Jogand-Coulomb et al. |
| 2010/0131774 A1 | 5/2010 | Jogand-Coulomb et al. |
| 2010/0131775 A1 | 5/2010 | Jogand-Coulomb et al. |
| 2010/0138652 A1 | 6/2010 | Sela et al. |
| 2010/0138673 A1 | 6/2010 | Jogand-Coulomb et al. |
| 2010/0169222 A1 | 7/2010 | Qawami et al. |
| 2010/0169544 A1 | 7/2010 | Eom et al. |
| 2010/0217927 A1 | 8/2010 | Song et al. |
| 2010/0223259 A1 | 9/2010 | Mizrahi |
| 2010/0228711 A1 | 9/2010 | Li et al. |
| 2010/0235409 A1 | 9/2010 | Roy et al. |
| 2010/0242096 A1* | 9/2010 | Varadharajan ........ H04L 63/029 726/4 |
| 2011/0026942 A1 | 2/2011 | Naito |
| 2011/0035757 A1 | 2/2011 | Comer |
| 2011/0058277 A1 | 3/2011 | de la Fuente et al. |
| 2011/0060775 A1 | 3/2011 | Fitzgerald |
| 2011/0071988 A1* | 3/2011 | Resch ................. G06F 11/1076 707/691 |
| 2011/0078407 A1 | 3/2011 | Lewis |
| 2011/0099324 A1 | 4/2011 | Yeh |
| 2011/0161679 A1 | 6/2011 | Grube et al. |
| 2011/0225417 A1 | 9/2011 | Maharajh et al. |
| 2011/0231597 A1 | 9/2011 | Lai et al. |
| 2011/0246716 A1 | 10/2011 | Frame et al. |
| 2011/0247074 A1 | 10/2011 | Manring et al. |
| 2011/0258630 A1 | 10/2011 | Fee et al. |
| 2011/0264717 A1 | 10/2011 | Grube et al. |
| 2011/0265143 A1 | 10/2011 | Grube et al. |
| 2011/0276656 A1 | 11/2011 | Knapp et al. |
| 2011/0282839 A1 | 11/2011 | Paksoy et al. |
| 2011/0289383 A1 | 11/2011 | Dhuse et al. |
| 2011/0307657 A1 | 12/2011 | Timashev et al. |
| 2012/0030411 A1 | 2/2012 | Wang et al. |
| 2012/0079562 A1 | 3/2012 | Anttila et al. |
| 2012/0137062 A1 | 5/2012 | Arges et al. |
| 2012/0143830 A1 | 6/2012 | Cormode et al. |
| 2012/0150528 A1 | 6/2012 | Upadhyaya et al. |
| 2012/0166576 A1 | 6/2012 | Orsini et al. |
| 2012/0173392 A1 | 7/2012 | Kirby et al. |
| 2012/0210092 A1 | 8/2012 | Feldman |
| 2012/0233228 A1 | 9/2012 | Barton et al. |
| 2012/0233432 A1 | 9/2012 | Feldman et al. |
| 2012/0284719 A1 | 11/2012 | Phan et al. |
| 2012/0306912 A1 | 12/2012 | Blanco et al. |
| 2012/0311260 A1 | 12/2012 | Yamagiwa et al. |
| 2013/0024581 A1 | 1/2013 | Myhill et al. |
| 2013/0046974 A1 | 2/2013 | Kamara et al. |
| 2013/0145371 A1 | 6/2013 | Brunswig et al. |
| 2013/0254166 A1 | 9/2013 | Kottomtharayil |
| 2013/0290263 A1 | 10/2013 | Beaverson et al. |
| 2014/0052706 A1 | 2/2014 | Misra et al. |
| 2014/0068208 A1 | 3/2014 | Feldman |
| 2014/0149794 A1* | 5/2014 | Shetty ................. H04L 67/1095 714/20 |
| 2014/0161123 A1 | 6/2014 | Starks et al. |
| 2015/0082458 A1 | 3/2015 | Cooper et al. |

FOREIGN PATENT DOCUMENTS

| | | |
|---|---|---|
| CN | 1619479 A | 5/2005 |
| CN | 1799051 A | 7/2006 |
| CN | 101043372 A | 9/2007 |
| CN | 101110083 A | 1/2008 |
| CN | 101477543 A | 7/2009 |
| CN | 101496005 A | 7/2009 |
| CN | 102292699 A | 12/2011 |
| EP | 0606131 B1 | 1/2003 |
| JP | H05113963 | 5/1993 |
| JP | H06149739 | 5/1994 |
| JP | H10261075 A | 9/1998 |
| JP | H1124997 A | 1/1999 |
| JP | H11259321 A | 9/1999 |
| JP | 2000023075 A | 1/2000 |
| JP | 2002278844 | 9/2002 |
| JP | 2005122311 | 5/2005 |
| JP | 2006285969 A | 10/2006 |
| JP | 2006526837 | 11/2006 |
| JP | 2007515002 A | 6/2007 |
| JP | 2007257566 A | 10/2007 |
| JP | 2007299308 | 11/2007 |
| JP | 2008299396 A | 12/2008 |
| JP | 2010251877 A | 11/2010 |
| JP | 2011043968 | 3/2011 |
| JP | 2011518381 A | 6/2011 |
| JP | 2011170667 A | 9/2011 |
| JP | 2011197977 A | 10/2011 |
| KR | 20020088574 A | 11/2002 |
| KR | 20070058281 A | 6/2007 |
| KR | 20070058281 | 2/2016 |
| WO | 0227489 A2 | 4/2002 |
| WO | 2007016787 A2 | 2/2007 |
| WO | 2010151813 A1 | 12/2010 |
| WO | 2012088587 A1 | 7/2012 |

OTHER PUBLICATIONS

Advanced Computer & Network Corporation, "RAID Level 6: Independent Data Disks With Two Independent Parity Schemes", May 7, 2011, retrieved from https://web.archive.org/web/20110507215950/http://www.acnc.com/raidedu/6, 2 pages.

Chen et al., "RAID: High-Performance, Reliable Secondary Storage," ACM Computing Surveys 1994, 26:145-185, retrieved on Jan. 11, 2016, from internet https://web.archive.org/web/20040721062927/http://meseec.ce.rit.edu/eecc722-fall2002/papers/io/3/chen94raid.pdf, 69 pages.

Massiglia, "The RAID Book: The Storage System Technology Handbook", 6th Edition, 1997, pp. 26-27, 84-91, 136-143, and 270-271.

Amazon Web Services, "Amazon Elastic MapReduce Developer Guide," API Version Nov. 30, 2009, dated Jun. 12, 2012, retrieved on Jun. 22, 2015, from https://web.archive.org/web/20120612043953/http://s3.amazonaws.com/ awsdocs/ElasticMapReduce/latest/emr-dg.pdf, 318 pages.

Amazon Web Services, Amazon Glacier Developer Guide, API Version Jun. 1, 2012, dated Aug. 20, 2012, retrieved Jun. 22, 2015, from https://web.archive.org/web/20120908043705/http://awsdocs.s3.amazonaws.com/glacier/latest/glacier-dg.pdf, 209 pages.

Amazon Web Services, "AWS Import/Export Developer Guide," API Version Jun. 3, 2010, dated Jun. 12, 2012, retrieved Jun. 22, 2015, from https://web.archive.org/web/20120612051330/http://s3.amazonaws.com/awsdocs/ImportExpert/latest/AWSImportExport-dg.pdf, 104 pages.

(56) References Cited

OTHER PUBLICATIONS

Amer et al., "Design Issues for a Shingled Write Disk System," 26th IEEE Symposium on Massive Storage Systems and Technologies: Research Track (MSST 2010):1-12, May 2010.
Cosco, "Cisco Standalone HDD Firmware Update Version 3.0—IBM Servers," Nov. 16, 2010, 5 pages.
Duan, "Research and Application of Distributed Parallel Search Hadoop Algorithm," 2012 International Conference on Systems and Informatics (ICSAI 2012), IEEE, May 19, 2012, pp. 2462-2465.
Gibson et al., "Directions for Shingled-Write and Two-Dimensional Magnetic Recording System Architectures: Synergies with Solid-State Disks (CMU-PDL-09-104)," Carnegie Mellon University Research Showcase, Parallel Data Laboratory, Research Centers and Institutes, pp. 1-3, May 1, 2009.
IEEE, "The Authoritative Dictionary of IEEE Standards Terms," Seventh Edition; 2000, p. 836.
International Search Report and Written Opinion dated Feb. 14, 2014, in International Patent Application No. PCT/US2013/053828, filed Aug. 6, 2013.
International Search Report and Written Opinion dated Feb. 14, 2014, in International Patent Application No. PCT/US2013/053853, filed Aug. 6, 2013.
International Search Report and Written Opinion dated Mar. 6, 2014, in International Patent Application No. PCT/US2013/053852, filed Aug. 6, 2013.
Jacobs et al., "Memory Systems, Cache, DRAM, Disk," Copyright 2007, Morgan Kaufman, 9 pages.
Merriam-Webster, "Predetermine," Current Edition of Dictionary, www.merriam-webster.com/dictionary, retrieved on Dec. 15, 2014.
Micheloni et al., "Inside NAND Flash Memories," Springer First Edition (ISBN 978-90-481-9430-8):40-42, Aug. 2010.
Roos, "How to Leverage an API for Conferencing," Dave Roos, published Jan. 2012, at http://money.howstuffworks.com/businesscommunications/ how-to-leverage-an-api-for-conferencing1.htm.
Rosenblum et al., "The Design and Implementation of a Log-Structured File System," University of California at Berkley, ACM Transactions on Computer Systems vol. /Issue 10(1):26-52, Feb. 1992.
Seagate, "Firmware Updates for Seagate Products," Author Unknown, published Feb. 2012 at http://knowledge.seagate.com/articles/en US/FAQ/207931en.
Wikipedia, "Checksum," from Wayback/Wikipedia at en.wikipedia.org/wiki/checksum, retrieved Mar. 2011, 5 pages.
Wikipedia, "Error Correction," from Wayback/Wikipedia.org at en.wikipedia.org/wiki/Error-correcting_code, retrieved Sep. 2010, 7 pages.
Wikipedia, "Hash Tree," from Wikipedia.org at http://en.wikipedia.org/wiki/Hash_tree, retrieved Jul. 12, 2012, 1 page.
Wikipedia, "Process identifier," dated Sep. 3, 2010, retrieved Jul. 9, 2015, from https://en.wikipedia.org/w/index.php?title=Process_identifier&oldid=382695536, 2 pages.
Yu et al., "Exploiting sequential access when declustering data over disks and MEMS-based storage," Distributed and Parallel Databases vol. /Issue 19(2-3):147-168, May 2006.
U.S. Appl. No. 13/569,984, filed Aug. 8, 2012.
U.S. Appl. No. 13/570,057, filed Aug. 8, 2012.
U.S. Appl. No. 13/570,005, filed Aug. 8, 2012.
U.S. Appl. No. 13/570,030, filed Aug. 8, 2012.
U.S. Appl. No. 13/569,994, filed Aug. 8, 2012.
U.S. Appl. No. 13/570,029, filed Aug. 8, 2012, now U.S. Pat. No. 9,092,441.
U.S. Appl. No. 13/570,092, filed Aug. 8, 2012.
U.S. Appl. No. 13/569,665, filed Aug. 8, 2012, now U.S. Pat. No. 8,959,067.
U.S. Appl. No. 13/569,591, filed Aug. 8, 2012.
U.S. Appl. No. 13/569,714, filed Aug. 8, 2012.
U.S. Appl. No. 13/570,088, filed Aug. 8, 2012.
U.S. Appl. No. 13/570,151, filed Aug. 8, 2012, now U.S. Pat. No. 8,805,793.
Kozierok, "File Allocation Tables," The PC Guide, Apr. 17, 2001, retrieved Nov. 28, 2016, from http://www.pcguide.com/ref/hdd/file/fatFATs-c.html, 2 pages.
Canadian Office Action dated Apr. 17, 2018, Patent Application No. 2881490, filed Aug. 6, 2013, 4 pages.
Canadian Office Action dated Apr. 25, 2018, Patent Application No. 2881475, filed Aug. 6, 2013, 5 pages.
Canadian Office Action dated Nov. 20, 2017, Patent Application No. 2881567, filed Aug. 6, 2013, 7 pages.
Chinese Decision on Rejection dated Sep. 5, 2018, Patent Application No. 201380042170.X, filed Aug. 6, 2013, 7 pages.
Chinese Notice on Grant of Patent Right for Invention dated Sep. 26, 2018, Patent Application No. 201380042166.3, filed Aug. 6, 2013, 2 pages.
Chinese Notice on Grant of Patent Right for Invention, dated Nov. 17, 2017, Patent Application No. 201380042169.7, filed Aug. 6, 2013, 2 pages.
Chinese Notice on the Third Office Action dated Mar. 19, 2018, Patent Application No. 201380042166.3, filed Aug. 6, 2013, 5 pages.
Chinese Second Office Action dated Jan. 12, 2018, Patent Application No. 201380042170.X, filed Aug. 6, 2013, 8 pages.
European Communication Pursuant to Article 94(3) EPC dated Feb. 19, 2018, Patent Application No. 13827419.6, filed Aug. 6, 2013, 3 pages.
Extended European Search Report dated Mar. 5, 2018, European Patent Application No. 17196030.5, filed Oct. 11, 2017, 9 pages.
Japanese Notice of Rejection dated Jul. 24, 2018, Patent Application No. 2017-080044, filed Aug. 6, 2013, 2 pages.
Japanese Official Notice of Rejection dated Aug. 7, 2018, Patent Application No. 2017-152756, filed Aug. 6, 2013, 4 pages.
Japanese Official Notice of Rejection dated Jun. 5, 2018, Patent Application No. 2017-094235, filed Aug. 6, 2013, 3 pages.
Korean Decision of Patent Grant, dated Nov. 1, 2017, Patent Application No. 10-2017-7021593, filed Aug. 6, 2013, 3 pages.
Singaporean Second Invitation to Respond to Written Opinion and Second Written Opinion dated Aug. 17, 2018, Patent Application No. 10201600997Y, filed Aug. 6, 2013, 6 pages.
Korean Decision of Patent Grant dated Nov. 27, 2018, Patent Application No. 10-2015-7005788, filed Aug. 6, 2013, 3 pages.
Canadian Notice of Allowance dated Apr. 24, 2019, Patent Application No. 2881475, filed Aug. 6, 2013, 1 page.
Canadian Notice of Allowance dated Mar. 8, 2019, Patent Application No. 2881490, filed Aug. 6, 2013, 1 page.
European Communication Pursuant to Article 94(3) EPC dated Nov. 15, 2019, Patent Application No. 17196030.5, filed Aug. 6, 2013, 6 pages.
Indian First Examination Report dated Nov. 26, 2019, Patent Application No. 1689/DELNP/2015, filed Aug. 6, 2013, 6 pages.
Indian First Examination Report dated Nov. 27, 2019, Patent Application No. 1686/DELNP/2015, filed Aug. 6, 2013, 7 pages.
Singaporean Notice of Eligibility for Grant and Examination Report dated Jan. 8, 2020, Patent Application No. 10201600997Y, filed Aug. 6, 2013, 5 pages.
Storer et al., "POTSHARDS—A Secure, Recoverable, Long-Term Archival Storage System," ACM Transactions on Storage, Published Jun. 2009, vol. 5, No. 2, Article 5, pp. 5:1 to 5:35.
Chinese Notice on Grant of Patent Rights for Invention dated Feb. 3, 2020, Patent Application No. 201380042170.X, filed Aug. 6, 2013, 2 pages.
Canadian Office Action dated Jan. 21, 2019, Patent Application No. 2881567, filed Aug. 6, 2013, 4 pages.
European Communication under Rule 71(3) EPC dated Nov. 20, 2018, Patent Application No. 13827419.6, filed Aug. 6, 2013, 75 pages.
Japanese Notice of Allowance dated Jan. 15, 2019, Patent Application No. 2017-080044, filed Aug. 6, 2013, 6 pages.
Australian Examination Report No. 1 dated Oct. 16, 2019, Patent Application No. 2018204309, filed Aug. 6, 2013, 5 pages.
Chinese Third Office Action dated Aug. 30, 2019, Patent Application No. 201380042170.X, filed Aug. 6, 2013, 5 pages.
Indian First Examination Report dated Aug. 26, 2019, Patent Application No. 1684/DELNP/2015, filed Aug. 6, 2013, 6 pages.

(56) References Cited

OTHER PUBLICATIONS

Australian Second Examination Report dated Mar. 23, 2020, Patent Application No. 2018204309, filed Aug. 6, 2013, 4 pages.
Brazilian Office Action dated Apr. 7, 2020, Patent Application No. BR1120150028373, 4 pages.
Canadian Office Action dated Dec. 31, 2019, Patent Application No. 2881567, 3 pages.

* cited by examiner

DATA STORAGE APPLICATION PROGRAMMING INTERFACE

CROSS REFERENCE TO RELATED APPLICATIONS

This application is a continuation of U.S. patent application Ser. No. 13/570,074, filed Aug. 8, 2012, entitled "DATA STORAGE APPLICATION PROGRAMMING INTERFACE," which incorporates by reference for all purposes the full disclosure of co-pending U.S. patent application Ser. No. 13/569,984, filed Aug. 8, 2012, entitled "LOG-BASED DATA STORAGE ON SEQUENTIALLY WRITTEN MEDIA," co-pending U.S. patent application Ser. No. 13/570,057, filed Aug. 8, 2012, entitled "DATA STORAGE MANAGEMENT FOR SEQUENTIALLY WRITTEN MEDIA," co-pending U.S. patent application Ser. No. 13/570,005, filed Aug. 8, 2012, entitled "DATA WRITE CACHING FOR SEQUENTIALLY WRITTEN MEDIA," co-pending U.S. patent application Ser. No. 13/570,030, filed Aug. 8, 2012, entitled "PROGRAMMABLE CHECKSUM CALCULATIONS ON DATA STORAGE DEVICES," co-pending U.S. patent application Ser. No. 13/569,994, filed Aug. 8, 2012, entitled "ARCHIVAL DATA IDENTIFICATION," co-pending U.S. patent application Ser. No. 13/570,029, filed Aug. 8, 2012, entitled "ARCHIVAL DATA ORGANIZATION AND MANAGEMENT," now U.S. Pat. No. 9,092,441, co-pending U.S. patent application Ser. No. 13/570,092, filed Aug. 8, 2012, entitled "ARCHIVAL DATA FLOW MANAGEMENT," co-pending U.S. patent application Ser. No. 13/570,088, filed Aug. 8, 2012, entitled "ARCHIVAL DATA STORAGE SYSTEM," co-pending U.S. patent application Ser. No. 13/569,591, filed Aug. 8, 2012, entitled "DATA STORAGE POWER MANAGEMENT," co-pending U.S. patent application Ser. No. 13/569,714, filed Aug. 8, 2012, entitled "DATA STORAGE SPACE MANAGEMENT," co-pending U.S. patent application Ser. No. 13/569,665, filed Aug. 8, 2012, entitled "DATA STORAGE INVENTORY INDEXING," now U.S. Pat. No. 8,959,067, and co-pending U.S. patent application Ser. No. 13/570,151, filed Aug. 8, 2012, entitled "DATA STORAGE INTEGRITY VALIDATION," now U.S. Pat. No. 8,805,793.

BACKGROUND

With increasing digitalization of information, the demand for durable and reliable archival data storage services is also increasing. Archival data may include archive records, backup files, media files and the like maintained by governments, businesses, libraries and the like. The archival storage of data has presented some challenges. For example, the potentially massive amount of data to be stored can cause costs to be prohibitive using many conventional technologies. Also, it is often desired that the durability and reliability of storage for archival data be relatively high, which further increases the amount of resources needed to store data, thereby increasing the expense. Conventional technologies such as magnetic tapes have traditionally been used in data backup systems because of the low cost. However, tape-based and other storage systems often fail to fully exploit advances in storage technology, such as data compression, error correction and the like, that enhance the security, reliability and scalability of data storage systems.

BRIEF DESCRIPTION OF THE DRAWINGS

Various embodiments in accordance with the present disclosure will be described with reference to the drawings, in which.

DETAILED DESCRIPTION

Figure 1:
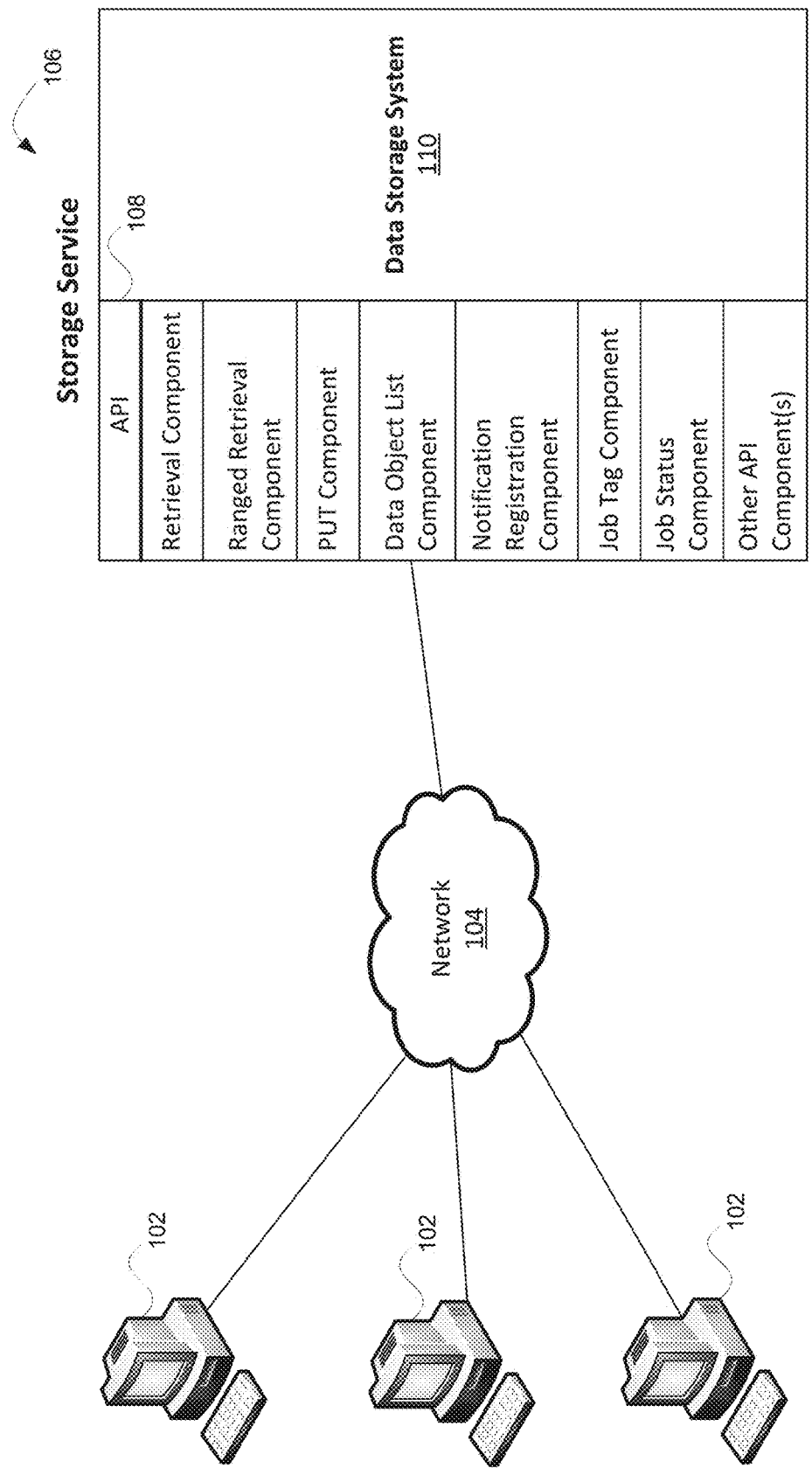
FIG. 1 illustrates an environment showing communication between customers and a data storage service, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to techniques for allowing interaction with a data storage service, such as an archival data storage service. In an embodiment, a data storage service is accessible through an application programming interface (API) that is usable by customers of the data storage service to access various capabilities of the data storage service. Customers may, for instance, use the API to store data, retrieve stored data, and perform other operations in connection with data.

In an embodiment, an API of a data storage service allows users to upload data for storage. An API call may, for example, include the data to be stored along with parameters for its storage. The API may also allow data to be uploaded in parts to, for example, decrease the possibility of failure when the data is large relative to available upload bandwidth. Similarly, the API may allow data to be downloaded, either in whole or in parts. When in parts, transmissions may include checksums or other data verification values for parts and for the complete data. In this manner, not only can the complete data be checked when the parts are put together, but the individual parts can be checked so that, if transmission of a part fails, the transmission may be retried without retransmitting parts that were successfully transmitted. As a result, resource intensive repeat transmission of data may be avoided.

In an embodiment, a data storage service provides certain data asynchronously. For example, an archival or other data storage service may, for various reasons related to efficiency and/or cost, provide requested data in an asynchronous manner. Accordingly, in an embodiment, an API for the data storage service allows a user to make an API call to request that the data storage service provide data. In response, the data storage service may provide, to the requestor, an identifier of a job corresponding to retrieval of the requested data. The data storage service may obtain the requested data from one storage location to put in another storage location that is more accessible to a customer. When the job is completed, e.g. the data is moved to a more accessible data storage location for staging, the identifier of the job may be provided in an API call to download some or all of the data.

The customer may become aware of the job completion in one or more ways. For example, an API call may specify parameters for notifications related to the job, such as when the job is complete or fails. The customer may receive a notification when the job completion has finished. The notifications may be received by the computer system that submitted the API call to retrieve the data and/or another computer system specified in notification parameters, such as by email address, internet protocol (IP) address and the like. The customer may also submit an API call to poll the data storage service for the status of one or more jobs. Such an API call may include one or more job identifiers. In response to such a call, the data storage service may provide the status of a job specified by identifier in the call. The status may specify, for example, that the job is in progress, has failed (possibly with information about the reason for failure), that the job has completed and/or other statuses. The customer may also, in some embodiments, assume that a job has completed after the passage of time. A data storage service, for example, may comply with a service-level agreement (SLA) which specifies that certain jobs will be completed in a specified period of time, such as 24 hours, although other times are within the scope of the present disclosure. With such an SLA (or possibly without), a customer may wait an appropriate period of time before requesting the output of a job, such as requested data. If the output is not ready, the request may fail.

Notifications may also be provided for events other than job completions. For example, in an embodiment, customers are able to, via an API call, register for various notifications in connection with access and mutation of data stored by a data storage service. The data storage service may maintain one or more logs regarding data access and mutation. The service may maintain the logs according to its own parameters and/or parameters provided by a customer. The customer may, for instance, submit an API call to, at least in part, specify parameters for when the storage system should log events. The customer may, for instance, specify a frequency at which a log is generated from metadata stored by the storage system. The customer may specify other parameters in addition or instead. Such parameters may specify certain events that should be logged (e.g. writes or deletions should be logged, but reads need not be logged), that a log should be generated after a certain number of events have occurred and/or a certain amount of data has changed and the like. Logs may record numerous types of data, such as the IP address of a computer system that submitted an API call to access data, the attempted operation, whether the operation succeeded or not, and the like. Customers may also specify actions to be performed in connection with generated logs. A customer may, for instance, use an API call to, at least in part, specify another service to transmit logs to, such as a different type of data storage service and/or programmatically managed computer system service.

In some embodiments, customers are able to provide their own information to be associated with jobs. A customer may, for example, submit an API call to initiate a job, such as a data retrieval job. A parameter of the API call may include information that the customer desires to have associated with the job to be initiated. The data storage service may associate the data with the job to provide later in connection with the job, such as in a notification when a job completes and/or with responses to API calls to get the output of the job. Such customer-provided information may be used in various ways. For example, the customer-provided information may include a database key for a database the customer would like the data to be inserted into once the data is downloaded. As another example, the customer-provided information may include code or other information that is recognizable by a customer computer system to cause the customer computer system to perform a particular action. In some embodiments, the customers-provided data may be, from the perspective of the storage service, arbitrary, thereby providing flexibility and extensibility from the customer perspective.

Other variations are also considered as being within the scope of the present disclosure. For example, various API calls may allow to advanced features of a data storage service. API calls may allow customers to copy data, move data to another service, move data to different geographical regions served by the data storage service and the like. Other variations are described below.

As noted, embodiments of the present disclosure are directed to techniques for allowing access to capabilities of a data storage system, such as an archival data storage system. FIG. 1 illustrates an example environment 100 in which such techniques may be implemented. As illustrated, customer devices ("customers," as described in more detail below) communicate through a communications network 104, such as the Internet, to a storage service 106. The customers 102 may, for instance, transmit data to the storage service 106 over the network 104 for storage by the storage service 106. The customers 102 may also transmit requests to perform operations in connection with data stored by the storage service 106, such as requests to access stored data, inventory stored data and/or requests to perform other operations, such as those described below. The customers 102 may be associated with entities that, from the perspective of the storage service 106, are third parties which utilize services provided by the storage service 106 in exchange for value, e.g. money. It should be noted, however, that the scope of the present disclosure includes embodiments where one or more of the customers 102 are associated with the same organization as is the storage service 106. For instance, one or more of the customers 102 may be part of an organization that owns and/or operates the storage service 106. As another example, the storage service 106 may be part of an organization that provides numerous computing services and the customers 102 may be computing resources hosted by the organization but are programmatically managed by the customers of the organization. The customers 102 may be, as an illustrative example, computer systems (which may be virtual computer systems) hosted by the organization but programmatically managed by third party customer entities of the organization.

The storage service 106 may be a computer system that performs one or more services in connection with data storage, as mentioned above and as described in more detail below. Customers 102 may transmit requests to the storage service 106 over the network 104 and the storage service 106 may process the requests and provide responses and other information (e.g. notifications) over the network 104 to the customers 102. The storage service 106 may, for instance, comprise one or more sub-systems networked together and hosted in one or more data centers. The storage service 106 may, as an illustrative example, be an archival data storage service such as described in more detail below.

As illustrated in FIG. 1, the storage service 106 may comprise an application programming interface (API) used to access services provided by a data storage system 110 which, for the purpose of discussion of FIG. 1, comprises the portions of the storage service 106 other than the API. Customers may transmit electronic messages to the storage service 106 according to the API. The API may be configured as described below in connection with FIG. 2, although variations and other APIs are considered as being within the scope of the present disclosure.

In accordance with various embodiments, the API provides customers the ability to access various functionalities of the storage service 106. Accordingly, in an embodiment, the API includes multiple components for accessing the various functionalities. For instance, in various embodiments, the API includes a retrieval component that provides customers the ability to retrieve information stored by the storage service 106. In some embodiments, the storage service allows the ability to retrieve information in parts. Retrieval in parts may be useful, for example, when retrieving large data objects. For example, if a retrieval operation for a single large data operation fails, the retrieval operation may have to be repeated and data that has already been transmitted may have to be retransmitted. Retrieval in parts may provide the ability to retrieve (e.g. download) portions of a large data object so that, if transmission of a portion fails, only data for that portion may need to be retransmitted. Accordingly, in accordance with an embodiment, the API includes a ranged retrieval component that allows customers to request only portions of a data object, such as by specifying a range of bytes (e.g. the first 1 MB of data or bytes 1 through 1,048,576 or bytes 1,048,577 through 2,097,152, etc.).

In order to allow customers 102 to transmit data to the storage service 106, in various embodiments, the storage service API 108 includes a PUT component, which may allow users to transmit (upload) data objects or portions thereof (e.g. in a manner similar to retrieving portions of a data object). Use of the PUT component may, from the customer perspective, appear synchronous, but completion of a request using the PUT component may be asynchronous. As an illustrative example, a response to a put API call to store a data object may include an identifier generated for the data object, as discussed in more detail below. The identifier may be usable to retrieve the data object. However, the identifier may be provided before the data storage system 110 actually persistently stores the data object in archival storage, thereby providing a synchronous experience to the customer 102 that made the API call.

Customers 102 may utilize the PUT component to store numerous data objects using the storage service 106. Accordingly, various embodiments of the present disclosure allow customers to obtain information about the objects they have stored by the storage service 106. As an example, as illustrated in FIG. 1, the storage service API 108 may include a data object list component. An API call to the data object list component may be used to obtain a list (or other organization of data) that identifies data objects of the customer that made the API call. In various embodiments, processing a request made using such an API call may be performed asynchronously. For instance, in response to an API call to obtain a data object list, a storage system may provide a job identifier before actually obtaining the list to provide to the requestor. The job identifier may be used to make API calls to get the status of the job (e.g. using a job status component of the API 108) and, when the job is eventually completed, obtain the list.

In general, in instances where asynchronous data processing techniques are used, embodiments of the present disclosure allow customers 102 to register for notifications regarding the status of various job-related events. For instance, instead of or in addition to polling the data storage system 102 for the status of a job, a customer 102 can register for a notification when the job is complete. As an example, the customer 102 may receive an electronic message when a requested data object is ready for download, when a list of data objects is available, and the like.

In addition, various embodiments of the present disclosure allow for advanced functionalities. For example, users of the customers 102 may be able to, using a job tag component of the API 108, provide their own tags for jobs that are created in response to customer API calls. The tags may be predefined and selected by users of the customers 102 and/or may be completely configurable by the users. For instance, a customer may include programming code and/or other information in a tag such that, when a system of the customer 102 receives a notification message, the system (or another system of the customer 102) can process the information and perform one or more actions in an automated fashion. For instance, a customer 102 may use the job tag component to include information for a retrieval job that, when processed by a computer system of the customer, cause the computer system of the customer (or another computer system of the customer) to download a corresponding data object when the retrieval job is completed.

As noted in FIG. 1, the API 108 may include additional components in addition to or instead of those components illustrated in the figure, many of which are described below in greater detail.

Figure 2:
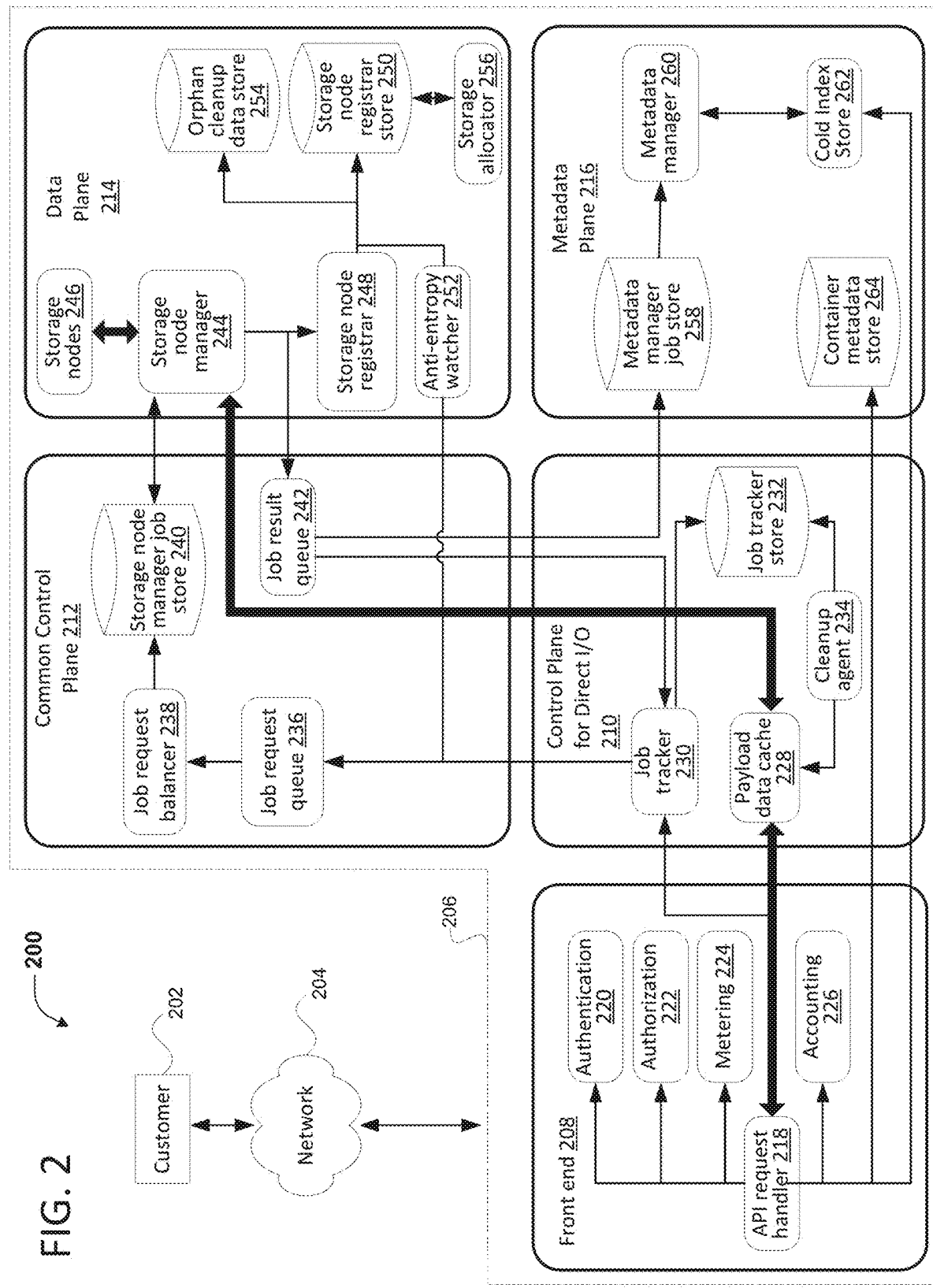
FIG. 2 illustrates an example environment in which archival data storage services may be implemented, in accordance with at least one embodiment.

FIG. 2 illustrates an example environment 200 in which an archival data storage system may be implemented, in accordance with at least one embodiment. One or more customers 202 connect, via a network 204, to an archival data storage system 206. As implied above, unless otherwise clear from context, the term "customer" refers to the system(s) of a customer entity (such as an individual, company or other organization) that utilizes data storage services described herein. Such systems may include datacenters, mainframes, individual computing devices, distributed computing environments and customer-accessible instances thereof or any other system capable of communicating with the archival data storage system. In some embodiments, a customer may refer to a machine instance (e.g., with direct hardware access) or virtual instance of a distributed computing system provided by a computing resource provider that also provides the archival data storage system. In some embodiments, the archival data storage system is integral to the distributed computing system and may include or be implemented by an instance, virtual or machine, of the distributed computing system. In various embodiments, network 204 may include the Internet, a local area network ("LAN"), a wide area network ("WAN"), a cellular data network and/or other data network.

In an embodiment, archival data storage system 206 provides a multi-tenant or multi-customer environment where each tenant or customer may store, retrieve, delete or otherwise manage data in a data storage space allocated to the customer. In some embodiments, an archival data storage system 206 comprises multiple subsystems or "planes" that each provides a particular set of services or functionalities. For example, as illustrated in FIG. 2, archival data storage system 206 includes front end 208, control plane for direct I/O 210, common control plane 212, data plane 214 and metadata plane 216. Each subsystem or plane may comprise one or more components that collectively provide the particular set of functionalities. Each component may be implemented by one or more physical and/or logical computing devices, such as computers, data storage devices and the like. Components within each subsystem may communicate with components within the same subsystem, components in other subsystems or external entities such as customers. At least some of such interactions are indicated by arrows in FIG. 2. In particular, the main bulk data transfer paths in and out of archival data storage system 206 are denoted by bold arrows. It will be appreciated by those of ordinary skill in the art that various embodiments may have fewer or a greater number of systems, subsystems and/or subcomponents than are illustrated in FIG. 2. Thus, the depiction of environment 200 in FIG. 2 should be taken as being illustrative in nature and not limiting to the scope of the disclosure.

In the illustrative embodiment, front end 208 implements a group of services that provides an interface between the archival data storage system 206 and external entities, such as one or more customers 202 described herein. In various embodiments, front end 208 provides an application programming interface ("API") to enable a user to programmatically interface with the various features, components and capabilities of the archival data storage system. Such APIs may be part of a user interface that may include graphical user interfaces (GUIs), Web-based interfaces, programmatic interfaces such as application programming interfaces (APIs) and/or sets of remote procedure calls (RPCs) corresponding to interface elements, messaging interfaces in which the interface elements correspond to messages of a communication protocol, and/or suitable combinations thereof.

Capabilities provided by archival data storage system 206 may include data storage, data retrieval, data deletion, metadata operations, configuration of various operational parameters and the like. Metadata operations may include requests to retrieve catalogs of data stored for a particular customer, data recovery requests, job inquires and the like. Configuration APIs may allow customers to configure account information, audit logs, policies, notifications settings and the like. A customer may request the performance of any of the above operations by sending API requests to the archival data storage system. Similarly, the archival data storage system may provide responses to customer requests. Such requests and responses may be submitted over any suitable communications protocol, such as Hypertext Transfer Protocol ("HTTP"), File Transfer Protocol ("FTP") and the like, in any suitable format, such as REpresentational State Transfer ("REST"), Simple Object Access Protocol ("SOAP") and the like. The requests and responses may be encoded, for example, using Base64 encoding, encrypted with a cryptographic key or the like.

In some embodiments, archival data storage system 206 allows customers to create one or more logical structures such as logical data containers in which to store one or more archival data objects. As used herein, data object is used broadly and does not necessarily imply any particular structure or relationship to other data. A data object may be, for instance, simply a sequence of bits. Typically, such logical data structures may be created to meeting certain business requirements of the customers and are independently of the physical organization of data stored in the archival data storage system. As used herein, the term "logical data container" refers to a grouping of data objects. For example, data objects created for a specific purpose or during a specific period of time may be stored in the same logical data container. Each logical data container may include nested data containers or data objects and may be associated with a set of policies such as size limit of the container, maximum number of data objects that may be stored in the container, expiration date, access control list and the like. In various embodiments, logical data containers may be created, deleted or otherwise modified by customers via API requests, by a system administrator or by the data storage system, for example, based on configurable information. For example, the following HTTP PUT request may be used, in an embodiment, to create a logical data container with name "logical-container-name" associated with a customer identified by an account identifier "accountId."

PUT/{accountId}/logical-container-name HTTP/1.1

In an embodiment, archival data storage system 206 provides the APIs for customers to store data objects into logical data containers. For example, the following HTTP POST request may be used, in an illustrative embodiment, to store a data object into a given logical container. In an embodiment, the request may specify the logical path of the storage location, data length, reference to the data payload, a digital digest of the data payload and other information. In one embodiment, the APIs may allow a customer to upload multiple data objects to one or more logical data containers in one request. In another embodiment where the data object is large, the APIs may allow a customer to upload the data object in multiple parts, each with a portion of the data object.

POST/{accountId}/logical-container-name/data HTTP/1.1
Content-Length: 1128192
x-ABC-data-description: "annual-result-2012.xls"
x-ABC-md5-tree-hash: 634d9a0688aff95c In response to a data storage request, in an embodiment, archival data storage system 206 provides a data object identifier if the data object is stored successfully. Such data object identifier may be used to retrieve, delete or otherwise refer to the stored data object in subsequent requests. In some embodiments, such data object identifier may be "self-describing" in that it includes (for example, with or without encryption) storage location information that may be used by the archival data storage system to locate the data object without the need for a additional data structures such as a global namespace key map. In addition, in some embodiments, data object identifiers may also encode other information such as payload digest, error-detection code, access control data and the other information that may be used to validate subsequent requests and data integrity. In some embodiments, the archival data storage system stores incoming data in a transient durable data store before moving it archival data storage. Thus, although customers may perceive that data is persisted durably at the moment when an upload request is completed, actual storage to a long-term persisted data store may not commence until sometime later (e.g., 12 hours later). In some embodiments, the timing of the actual storage may depend on the size of the data object, the system load during a diurnal cycle, configurable information such as a service-level agreement between a customer and a storage service provider and other factors.

In some embodiments, archival data storage system 206 provides the APIs for customers to retrieve data stored in the archival data storage system. In such embodiments, a customer may initiate a job to perform the data retrieval and may learn the completion of the job by a notification or by polling the system for the status of the job. As used herein, a "job" refers to a data-related activity corresponding to a customer request that may be performed temporally independently from the time the request is received. For example, a job may include retrieving, storing and deleting data, retrieving metadata and the like. A job may be identified by a job identifier that may be unique, for example, among all the jobs for a particular customer. For example, the following HTTP POST request may be used, in an illustrative embodiment, to initiate a job to retrieve a data object identified by a data object identifier "dataObjectId." In other embodiments, a data retrieval request may request the retrieval of multiple data objects, data objects associated with a logical data container and the like.
POST/{accountId}/logical-data-container-name/data/
    {dataObjectId}HTTP/1.1

In response to the request, in an embodiment, archival data storage system 206 provides a job identifier job-id," that is assigned to the job in the following response. The response provides, in this example, a path to the storage location where the retrieved data will be stored.
HTTP/1.1 202 ACCEPTED
Location:/{accountId}/logical-data-container-name/jobs/
    {job-id}

At any given point in time, the archival data storage system may have many jobs pending for various data operations. In some embodiments, the archival data storage system may employ job planning and optimization techniques such as batch processing, load balancing, job coalescence and the like, to optimize system metrics such as cost, performance, scalability and the like. In some embodiments, the timing of the actual data retrieval depends on factors such as the size of the retrieved data, the system load and capacity, active status of storage devices and the like. For example, in some embodiments, at least some data storage devices in an archival data storage system may be activated or inactivated according to a power management schedule, for example, to reduce operational costs. Thus, retrieval of data stored in a currently active storage device (such as a rotating hard drive) may be faster than retrieval of data stored in a currently inactive storage device (such as a spinned-down hard drive).

In an embodiment, when a data retrieval job is completed, the retrieved data is stored in a staging data store and made available for customer download. In some embodiments, a customer is notified of the change in status of a job by a configurable notification service. In other embodiments, a customer may learn of the status of a job by polling the system using a job identifier. The following HTTP GET request may be used, in an embodiment, to download data that is retrieved by a job identified by "job-id," using a download path that has been previously provided.
GET/{accountId}/logical-data-container-name/jobs/{job-
    id}/output HTTP/1.1

In response to the GET request, in an illustrative embodiment, archival data storage system 206 may provide the retrieved data in the following HTTP response, with a tree-hash of the data for verification purposes.
HTTP/1.1 200 OK
Content-Length: 1128192
x-ABC-archive-description: "retrieved stuff"
x-ABC-md5-tree-hash: 693d9a7838aff95c
[1112192 bytes of user data follows]

In an embodiment, a customer may request the deletion of a data object stored in an archival data storage system by specifying a data object identifier associated with the data object. For example, in an illustrative embodiment, a data object with data object identifier "dataObjectId" may be deleted using the following HTTP request. In another embodiment, a customer may request the deletion of multiple data objects such as those associated with a particular logical data container.
DELETE/{accountId}/logical-data-container-name/data/
    {dataObjectId}HTTP/1.1

In various embodiments, data objects may be deleted in response to a customer request or may be deleted automatically according to a user-specified or default expiration date. In some embodiments, data objects may be rendered inaccessible to customers upon an expiration time but remain recoverable during a grace period beyond the expiration time. In various embodiments, the grace period may be based on configurable information such as customer configuration, service-level agreement terms and the like. In some embodiments, a customer may be provided the abilities to query or receive notifications for pending data deletions and/or cancel one or more of the pending data deletions. For example, in one embodiment, a customer may set up notification configurations associated with a logical data container such that the customer will receive notifications of certain events pertinent to the logical data container. Such events may include the completion of a data retrieval job request, the completion of metadata request, deletion of data objects or logical data containers and the like.

In an embodiment, archival data storage system 206 also provides metadata APIs for retrieving and managing metadata such as metadata associated with logical data containers. In various embodiments, such requests may be handled asynchronously (where results are returned later) or synchronously (where results are returned immediately).

Still referring to FIG. 2, in an embodiment, at least some of the API requests discussed above are handled by API request handler 218 as part of front end 208. For example, API request handler 218 may decode and/or parse an incoming API request to extract information, such as uniform resource identifier ("URI"), requested action and associated parameters, identity information, data object identifiers and the like. In addition, API request handler 218 invoke other services (described below), where necessary, to further process the API request.

In an embodiment, front end 208 includes an authentication service 220 that may be invoked, for example, by API handler 218, to authenticate an API request. For example, in some embodiments, authentication service 220 may verify identity information submitted with the API request such as username and password Internet Protocol ("IP") address, cookies, digital certificate, digital signature and the like. In other embodiments, authentication service 220 may require the customer to provide additional information or perform additional steps to authenticate the request, such as required in a multifactor authentication scheme, under a challenge-response authentication protocol and the like.

In an embodiment, front end 208 includes an authorization service 222 that may be invoked, for example, by API handler 218, to determine whether a requested access is permitted according to one or more policies determined to be relevant to the request. For example, in one embodiment, authorization service 222 verifies that a requested access is directed to data objects contained in the requestor's own logical data containers or which the requester is otherwise authorized to access. In some embodiments, authorization service 222 or other services of front end 208 may check the validity and integrity of a data request based at least in part on information encoded in the request, such as validation information encoded by a data object identifier.

In an embodiment, front end 208 includes a metering service 224 that monitors service usage information for each customer such as data storage space used, number of data objects stored, data requests processed and the like. In an embodiment, front end 208 also includes accounting service 226 that performs accounting and billing-related functionalities based, for example, on the metering information collected by the metering service 224, customer account information and the like. For example, a customer may be charged a fee based on the storage space used by the customer, size and number of the data objects, types and number of requests submitted, customer account type, service level agreement the like.

In an embodiment, front end 208 batch processes some or all incoming requests. For example, front end 208 may wait until a certain number of requests has been received before processing (e.g., authentication, authorization, accounting and the like) the requests. Such a batch processing of incoming requests may be used to gain efficiency.

In some embodiments, front end 208 may invoke services provided by other subsystems of the archival data storage system to further process an API request. For example, front end 208 may invoke services in metadata plane 216 to fulfill metadata requests. For another example, front end 208 may stream data in and out of control plane for direct I/O 210 for data storage and retrieval requests, respectively.

Referring now to control plane for direct I/O 210 illustrated in FIG. 2, in various embodiments, control plane for direct I/O 210 provides services that create, track and manage jobs created as a result of customer requests. As discussed above, a job refers to a customer-initiated activity that may be performed asynchronously to the initiating request, such as data retrieval, storage, metadata queries or the like. In an embodiment, control plane for direct I/O 210 includes a job tracker 230 that is configured to create job records or entries corresponding to customer requests, such as those received from API request handler 218, and monitor the execution of the jobs. In various embodiments, a job record may include information related to the execution of a job such as a customer account identifier, job identifier, data object identifier, reference to payload data cache 228 (described below), job status, data validation information and the like. In some embodiments, job tracker 230 may collect information necessary to construct a job record from multiple requests. For example, when a large amount of data is requested to be stored, data upload may be broken into multiple requests, each uploading a portion of the data. In such a case, job tracker 230 may maintain information to keep track of the upload status to ensure that all data parts have been received before a job record is created. In some embodiments, job tracker 230 also obtains a data object identifier associated with the data to be stored and provides the data object identifier, for example, to a front end service to be returned to a customer. In an embodiment, such data object identifier may be obtained from data plane 214 services such as storage node manager 244, storage node registrar 248, and the like, described below.

In some embodiments, control plane for direct I/O 210 includes a job tracker store 232 for storing job entries or records. In various embodiments, job tracker store 230 may be implemented by a NoSQL data management system, such as a key-value data store, a relational database management system ("RDBMS") or any other data storage system. In some embodiments, data stored in job tracker store 230 may be partitioned to enable fast enumeration of jobs that belong to a specific customer, facilitate efficient bulk record deletion, parallel processing by separate instances of a service and the like. For example, job tracker store 230 may implement tables that are partitioned according to customer account identifiers and that use job identifiers as range keys. In an embodiment, job tracker store 230 is further sub-partitioned based on time (such as job expiration time) to facilitate job expiration and cleanup operations. In an embodiment, transactions against job tracker store 232 may be aggregated to reduce the total number of transactions. For example, in some embodiments, a job tracker 230 may perform aggregate multiple jobs corresponding to multiple requests into one single aggregated job before inserting it into job tracker store 232.

In an embodiment, job tracker 230 is configured to submit the job for further job scheduling and planning, for example, by services in common control plane 212. Additionally, job tracker 230 may be configured to monitor the execution of jobs and update corresponding job records in job tracker store 232 as jobs are completed. In some embodiments, job tracker 230 may be further configured to handle customer queries such as job status queries. In some embodiments, job tracker 230 also provides notifications of job status changes to customers or other services of the archival data storage system. For example, when a data retrieval job is completed, job tracker 230 may cause a customer to be notified (for example, using a notification service) that data is available for download. As another example, when a data storage job is completed, job tracker 230 may notify a cleanup agent 234 to remove payload data associated with the data storage job from a transient payload data cache 228, described below.

In an embodiment, control plane for direct I/O 210 includes a payload data cache 228 for providing transient data storage services for payload data transiting between data plane 214 and front end 208. Such data includes incoming data pending storage and outgoing data pending customer download. As used herein, transient data store is used interchangeably with temporary or staging data store to refer to a data store that is used to store data objects before they are stored in an archival data storage described herein or to store data objects that are retrieved from the archival data storage. A transient data store may provide volatile or non-volatile (durable) storage. In most embodiments, while potentially usable for persistently storing data, a transient data store is intended to store data for a shorter period of time than an archival data storage system and may be less cost-effective than the data archival storage system described herein. In one embodiment, transient data storage services provided for incoming and outgoing data may be differentiated. For example, data storage for the incoming data, which is not yet persisted in archival data storage, may provide higher reliability and durability than data storage for outgoing (retrieved) data, which is already persisted in archival data storage. In another embodiment, transient storage may be optional for incoming data, that is, incoming data may be stored directly in archival data storage without being stored in transient data storage such as payload data cache 228, for example, when there is the system has sufficient bandwidth and/or capacity to do so.

In an embodiment, control plane for direct I/O 210 also includes a cleanup agent 234 that monitors job tracker store 232 and/or payload data cache 228 and removes data that is no longer needed. For example, payload data associated with a data storage request may be safely removed from payload data cache 228 after the data is persisted in permanent storage (e.g., data plane 214). On the reverse path, data staged for customer download may be removed from payload data cache 228 after a configurable period of time (e.g., 30 days since the data is staged) or after a customer indicates that the staged data is no longer needed.

In some embodiments, cleanup agent 234 removes a job record from job tracker store 232 when the job status indicates that the job is complete or aborted. As discussed above, in some embodiments, job tracker store 232 may be partitioned to enable to enable faster cleanup. In one embodiment where data is partitioned by customer account identifiers, cleanup agent 234 may remove an entire table that stores jobs for a particular customer account when the jobs are completed instead of deleting individual jobs one at a time. In another embodiment where data is further sub-partitioned based on job expiration time cleanup agent 234 may bulk-delete a whole partition or table of jobs after all the jobs in the partition expire. In other embodiments, cleanup agent 234 may receive instructions or control messages (such as indication that jobs are completed) from other services such as job tracker 230 that cause the cleanup agent 234 to remove job records from job tracker store 232 and/or payload data cache 228.

Referring now to common control plane 212 illustrated in FIG. 2. In various embodiments, common control plane 212 provides a queue-based load leveling service to dampen peak to average load levels (jobs) coming from control plane for I/O 210 and to deliver manageable workload to data plane 214. In an embodiment, common control plane 212 includes a job request queue 236 for receiving jobs created by job tracker 230 in control plane for direct I/O 210, described above, a storage node manager job store 240 from which services from data plane 214 (e.g., storage node managers 244) pick up work to execute and a request balancer 238 for transferring job items from job request queue 236 to storage node manager job store 240 in an intelligent manner.

In an embodiment, job request queue 236 provides a service for inserting items into and removing items from a queue (e.g., first-in-first-out (FIFO) or first-in-last-out (FILO)), a set or any other suitable data structure. Job entries in the job request queue 236 may be similar to or different from job records stored in job tracker store 232, described above.

In an embodiment, common control plane 212 also provides a durable high efficiency job store, storage node manager job store 240, that allows services from data plane 214 (e.g., storage node manager 244, anti-entropy watcher 252) to perform job planning optimization, check pointing and recovery. For example, in an embodiment, storage node manager job store 240 allows the job optimization such as batch processing, operation coalescing and the like by supporting scanning, querying, sorting or otherwise manipulating and managing job items stored in storage node manager job store 240. In an embodiment, a storage node manager 244 scans incoming jobs and sort the jobs by the type of data operation (e.g., read, write or delete), storage locations (e.g., volume, disk), customer account identifier and the like. The storage node manager 244 may then reorder, coalesce, group in batches or otherwise manipulate and schedule the jobs for processing. For example, in one embodiment, the storage node manager 244 may batch process all the write operations before all the read and delete operations. In another embodiment, the storage node manager 224 may perform operation coalescing. For another example, the storage node manager 224 may coalesce multiple retrieval jobs for the same object into one job or cancel a storage job and a deletion job for the same data object where the deletion job comes after the storage job.

In an embodiment, storage node manager job store 240 is partitioned, for example, based on job identifiers, so as to allow independent processing of multiple storage node managers 244 and to provide even distribution of the incoming workload to all participating storage node managers 244. In various embodiments, storage node manager job store 240 may be implemented by a NoSQL data management system, such as a key-value data store, a RDBMS or any other data storage system.

In an embodiment, request balancer 238 provides a service for transferring job items from job request queue 236 to storage node manager job store 240 so as to smooth out variation in workload and to increase system availability. For example, request balancer 238 may transfer job items from job request queue 236 at a lower rate or at a smaller granularity when there is a surge in job requests coming into the job request queue 236 and vice versa when there is a lull in incoming job requests so as to maintain a relatively sustainable level of workload in the storage node manager store 240. In some embodiments, such sustainable level of workload is around the same or below the average workload of the system.

In an embodiment, job items that are completed are removed from storage node manager job store 240 and added to the job result queue 242. In an embodiment, data plane 214 services (e.g., storage node manager 244) are responsible for removing the job items from the storage node manager job store 240 and adding them to job result queue 242. In some embodiments, job request queue 242 is implemented in a similar manner as job request queue 235, discussed above.

Referring now to data plane 214 illustrated in FIG. 2. In various embodiments, data plane 214 provides services related to long-term archival data storage, retrieval and deletion, data management and placement, anti-entropy operations and the like. In various embodiments, data plane 214 may include any number and type of storage entities such as data storage devices (such as tape drives, hard disk drives, solid state devices, and the like), storage nodes or servers, datacenters and the like. Such storage entities may be physical, virtual or any abstraction thereof (e.g., instances of distributed storage and/or computing systems) and may be organized into any topology, including hierarchical or tiered topologies. Similarly, the components of the data plane may be dispersed, local or any combination thereof. For example, various computing or storage components may be local or remote to any number of datacenters, servers or data storage devices, which in turn may be local or remote relative to one another. In various embodiments, physical storage entities may be designed for minimizing power and cooling costs by controlling the portions of physical hardware that are active (e.g., the number of hard drives that are actively rotating). In an embodiment, physical storage entities implement techniques, such as Shingled Magnetic Recording (SMR), to increase storage capacity.

In an environment illustrated by FIG. 2, one or more storage node managers 244 each controls one or more storage nodes 246 by sending and receiving data and control messages. Each storage node 246 in turn controls a (potentially large) collection of data storage devices such as hard disk drives. In various embodiments, a storage node manager 244 may communicate with one or more storage nodes 246 and a storage node 246 may communicate with one or more storage node managers 244. In an embodiment, storage node managers 244 are implemented by one or more computing devices that are capable of performing relatively complex computations such as digest computation, data encoding and decoding, job planning and optimization and the like. In some embodiments, storage nodes 244 are implemented by one or more computing devices with less powerful computation capabilities than storage node managers 244. Further, in some embodiments the storage node manager 244 may not be included in the data path. For example, data may be transmitted from the payload data cache 228 directly to the storage nodes 246 or from one or more storage nodes 246 to the payload data cache 228. In this way, the storage node manager 244 may transmit instructions to the payload data cache 228 and/or the storage nodes 246 without receiving the payloads directly from the payload data cache 228 and/or storage nodes 246. In various embodiments, a storage node manager 244 may send instructions or control messages to any other components of the archival data storage system 206 described herein to direct the flow of data.

In an embodiment, a storage node manager 244 serves as an entry point for jobs coming into and out of data plane 214 by picking job items from common control plane 212 (e.g., storage node manager job store 240), retrieving staged data from payload data cache 228 and performing necessary data encoding for data storage jobs and requesting appropriate storage nodes 246 to store, retrieve or delete data. Once the storage nodes 246 finish performing the requested data operations, the storage node manager 244 may perform additional processing, such as data decoding and storing retrieved data in payload data cache 228 for data retrieval jobs, and update job records in common control plane 212 (e.g., removing finished jobs from storage node manager job store 240 and adding them to job result queue 242).

In an embodiment, storage node manager 244 performs data encoding according to one or more data encoding schemes before data storage to provide data redundancy, security and the like. Such data encoding schemes may include encryption schemes, redundancy encoding schemes such as erasure encoding, redundant array of independent disks (RAID) encoding schemes, replication and the like. Likewise, in an embodiment, storage node managers 244 performs corresponding data decoding schemes, such as decryption, erasure-decoding and the like, after data retrieval to restore the original data.

As discussed above in connection with storage node manager job store 240, storage node managers 244 may implement job planning and optimizations such as batch processing, operation coalescing and the like to increase efficiency. In some embodiments, jobs are partitioned among storage node managers so that there is little or no overlap between the partitions. Such embodiments facilitate parallel processing by multiple storage node managers, for example, by reducing the probability of racing or locking.

In various embodiments, data plane 214 is implemented to facilitate data integrity. For example, storage entities handling bulk data flows such as storage nodes managers 244 and/or storage nodes 246 may validate the digest of data stored or retrieved, check the error-detection code to ensure integrity of metadata and the like.

In various embodiments, data plane 214 is implemented to facilitate scalability and reliability of the archival data storage system. For example, in one embodiment, storage node managers 244 maintain no or little internal state so that they can be added, removed or replaced with little adverse impact. In one embodiment, each storage device is a self-contained and self-describing storage unit capable of providing information about data stored thereon. Such information may be used to facilitate data recovery in case of data loss. Furthermore, in one embodiment, each storage node 246 is capable of collecting and reporting information about the storage node including the network location of the storage node and storage information of connected storage devices to one or more storage node registrars 248 and/or storage node registrar stores 250. In some embodiments, storage nodes 246 perform such self-reporting at system start up time and periodically provide updated information. In various embodiments, such a self-reporting approach provides dynamic and up-to-date directory information without the need to maintain a global namespace key map or index which can grow substantially as large amounts of data objects are stored in the archival data system.

In an embodiment, data plane 214 may also include one or more storage node registrars 248 that provide directory information for storage entities and data stored thereon, data placement services and the like. Storage node registrars 248 may communicate with and act as a front end service to one or more storage node registrar stores 250, which provide storage for the storage node registrars 248. In various embodiments, storage node registrar store 250 may be implemented by a NoSQL data management system, such as a key-value data store, a RDBMS or any other data storage system. In some embodiments, storage node registrar stores 250 may be partitioned to enable parallel processing by multiple instances of services. As discussed above, in an embodiment, information stored at storage node registrar store 250 is based at least partially on information reported by storage nodes 246 themselves.

In some embodiments, storage node registrars 248 provide directory service, for example, to storage node managers 244 that want to determine which storage nodes 246 to contact for data storage, retrieval and deletion operations. For example, given a volume identifier provided by a storage node manager 244, storage node registrars 248 may provide, based on a mapping maintained in a storage node registrar store 250, a list of storage nodes that host volume components corresponding to the volume identifier. Specifically, in one embodiment, storage node registrar store 250 stores a mapping between a list of identifiers of volumes or volume components and endpoints, such as Domain Name System (DNS) names, of storage nodes that host the volumes or volume components.

As used herein, a "volume" refers to a logical storage space within a data storage system in which data objects may be stored. A volume may be identified by a volume identifier. A volume may reside in one physical storage device (e.g., a hard disk) or span across multiple storage devices. In the latter case, a volume comprises a plurality of volume components each residing on a different storage device. As used herein, a "volume component" refers a portion of a volume that is physically stored in a storage entity such as a storage device. Volume components for the same volume may be stored on different storage entities. In one embodiment, when data is encoded by a redundancy encoding scheme (e.g., erasure coding scheme, RAID, replication), each encoded data component or "shard" may be stored in a different volume component to provide fault tolerance and isolation. In some embodiments, a volume component is identified by a volume component identifier that includes a volume identifier and a shard slot identifier. As used herein, a shard slot identifies a particular shard, row or stripe of data in a redundancy encoding scheme. For example, in one embodiment, a shard slot corresponds to an erasure coding matrix row. In some embodiments, storage node registrar store 250 also stores information about volumes or volume components such as total, used and free space, number of data objects stored and the like.

In some embodiments, data plane 214 also includes a storage allocator 256 for allocating storage space (e.g., volumes) on storage nodes to store new data objects, based at least in part on information maintained by storage node registrar store 250, to satisfy data isolation and fault tolerance constraints. In some embodiments, storage allocator 256 requires manual intervention.

In some embodiments, data plane 214 also includes an anti-entropy watcher 252 for detecting entropic effects and initiating anti-entropy correction routines. For example, anti-entropy watcher 252 may be responsible for monitoring activities and status of all storage entities such as storage nodes, reconciling live or actual data with maintained data and the like. In various embodiments, entropic effects include, but are not limited to, performance degradation due to data fragmentation resulting from repeated write and rewrite cycles, hardware wear (e.g., of magnetic media), data unavailability and/or data loss due to hardware/software malfunction, environmental factors, physical destruction of hardware, random chance or other causes. Anti-entropy watcher 252 may detect such effects and in some embodiments may preemptively and/or reactively institute anti-entropy correction routines and/or policies.

In an embodiment, anti-entropy watcher 252 causes storage nodes 246 to perform periodic anti-entropy scans on storage devices connected to the storage nodes. Anti-entropy watcher 252 may also inject requests in job request queue 236 (and subsequently job result queue 242) to collect information, recover data and the like. In some embodiments, anti-entropy watcher 252 may perform scans, for example, on cold index store 262, described below, and storage nodes 246, to ensure referential integrity.

In an embodiment, information stored at storage node registrar store 250 is used by a variety of services such as storage node registrar 248, storage allocator 256, anti-entropy watcher 252 and the like. For example, storage node registrar 248 may provide data location and placement services (e.g., to storage node managers 244) during data storage, retrieval and deletion. For example, given the size of a data object to be stored and information maintained by storage node registrar store 250, a storage node registrar 248 may determine where (e.g., volume) to store the data object and provides an indication of the storage location of the data object which may be used to generate a data object identifier associated with the data object. As another example, in an embodiment, storage allocator 256 uses information stored in storage node registrar store 250 to create and place volume components for new volumes in specific storage nodes to satisfy isolation and fault tolerance constraints. As yet another example, in an embodiment, anti-entropy watcher 252 uses information stored in storage node registrar store 250 to detect entropic effects such as data loss, hardware failure and the like.

In some embodiments, data plane 214 also includes an orphan cleanup data store 254, which is used to track orphans in the storage system. As used herein, an orphan is a stored data object that is not referenced by any external entity. In various embodiments, orphan cleanup data store 254 may be implemented by a NoSQL data management system, such as a key-value data store, an RDBMS or any other data storage system. In some embodiments, storage node registrars 248 stores object placement information in orphan cleanup data store 254. Subsequently, information stored in orphan cleanup data store 254 may be compared, for example, by an anti-entropy watcher 252, with information maintained in metadata plane 216. If an orphan is detected, in some embodiments, a request is inserted in the common control plane 212 to delete the orphan.

Referring now to metadata plane 216 illustrated in FIG. 2. In various embodiments, metadata plane 216 provides information about data objects stored in the system for inventory and accounting purposes, to satisfy customer metadata inquiries and the like. In the illustrated embodiment, metadata plane 216 includes a metadata manager job store 258 which stores information about executed transactions based on entries from job result queue 242 in common control plane 212. In various embodiments, metadata manager job store 258 may be implemented by a NoSQL data management system, such as a key-value data store, a RDBMS or any other data storage system. In some embodiments, metadata manager job store 258 is partitioned and sub-partitioned, for example, based on logical data containers, to facilitate parallel processing by multiple instances of services such as metadata manager 260.

In the illustrative embodiment, metadata plane 216 also includes one or more metadata managers 260 for generating a cold index of data objects (e.g., stored in cold index store 262) based on records in metadata manager job store 258. As used herein, a "cold" index refers to an index that is updated infrequently. In various embodiments, a cold index is maintained to reduce cost overhead. In some embodiments, multiple metadata managers 260 may periodically read and process records from different partitions in metadata manager job store 258 in parallel and store the result in a cold index store 262.

In some embodiments cold index store 262 may be implemented by a reliable and durable data storage service. In some embodiments, cold index store 262 is configured to handle metadata requests initiated by customers. For example, a customer may issue a request to list all data objects contained in a given logical data container. In response to such a request, cold index store 262 may provide a list of identifiers of all data objects contained in the logical data container based on information maintained by cold index 262. In some embodiments, an operation may take a relative long period of time and the customer may be provided a job identifier to retrieve the result when the job is done. In other embodiments, cold index store 262 is configured to handle inquiries from other services, for example, from front end 208 for inventory, accounting and billing purposes.

In some embodiments, metadata plane 216 may also include a container metadata store 264 that stores information about logical data containers such as container ownership, policies, usage and the like. Such information may be used, for example, by front end 208 services, to perform authorization, metering, accounting and the like. In various embodiments, container metadata store 264 may be implemented by a NoSQL data management system, such as a key-value data store, a RDBMS or any other data storage system.

As described herein, in various embodiments, the archival data storage system 206 described herein is implemented to be efficient and scalable. For example, in an embodiment, batch processing and request coalescing is used at various stages (e.g., front end request handling, control plane job request handling, data plane data request handling) to improve efficiency. For another example, in an embodiment, processing of metadata such as jobs, requests and the like are partitioned so as to facilitate parallel processing of the partitions by multiple instances of services.

In an embodiment, data elements stored in the archival data storage system (such as data components, volumes, described below) are self-describing so as to avoid the need for a global index data structure. For example, in an embodiment, data objects stored in the system may be addressable by data object identifiers that encode storage location information. For another example, in an embodiment, volumes may store information about which data objects are stored in the volume and storage nodes and devices storing such volumes may collectively report their inventory and hardware information to provide a global view of the data stored in the system (such as evidenced by information stored in storage node registrar store 250). In such an embodiment, the global view is provided for efficiency only and not required to locate data stored in the system.

In various embodiments, the archival data storage system described herein is implemented to improve data reliability and durability. For example, in an embodiment, a data object is redundantly encoded into a plurality of data components and stored across different data storage entities to provide fault tolerance. For another example, in an embodiment, data elements have multiple levels of integrity checks. In an embodiment, parent/child relations always have additional information to ensure full referential integrity. For example, in an embodiment, bulk data transmission and storage paths are protected by having the initiator pre-calculate the digest on the data before transmission and subsequently supply the digest with the data to a receiver. The receiver of the data transmission is responsible for recalculation, comparing and then acknowledging to the sender that includes the recalculated digest. Such data integrity checks may be implemented, for example, by front end services, transient data storage services, data plane storage entities and the like described above.

Figure 3:
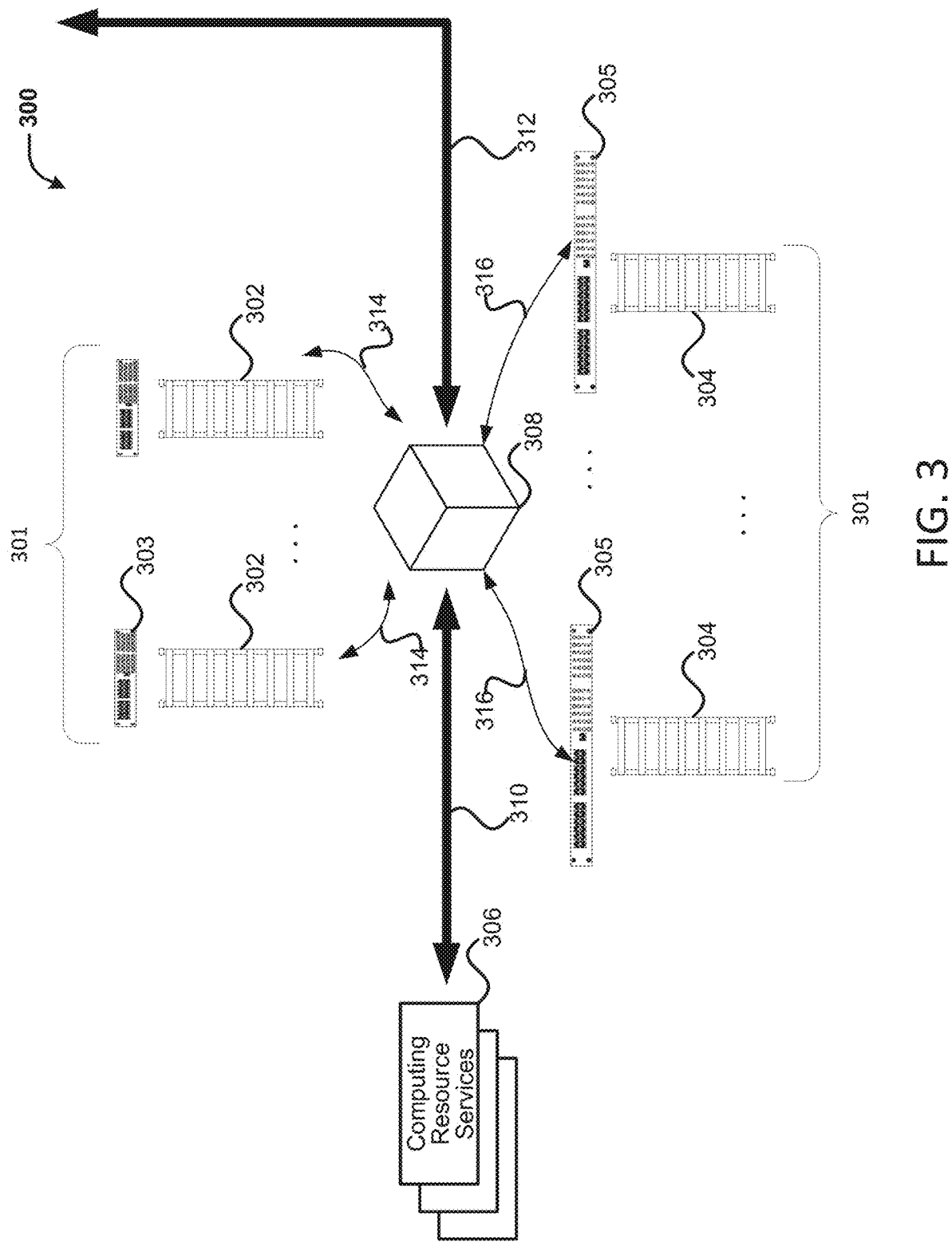
FIG. 3 illustrates an interconnection network in which components of an archival data storage system may be connected, in accordance with at least one embodiment.

FIG. 3 illustrates an interconnection network 300 in which components of an archival data storage system may be connected, in accordance with at least one embodiment. In particular, the illustrated example shows how data plane components are connected to the interconnection network 300. In some embodiments, the interconnection network 300 may include a fat tree interconnection network where the link bandwidth grows higher or "fatter" towards the root of the tree. In the illustrated example, data plane includes one or more datacenters 301. Each datacenter 301 may include one or more storage node manager server racks 302 where each server rack hosts one or more servers that collectively provide the functionality of a storage node manager such as described in connection with FIG. 2. In other embodiments, each storage node manager server rack may host more than one storage node manager. Configuration parameters such as number of storage node managers per rack, number of storage node manager racks and the like may be determined based on factors such as cost, scalability, redundancy and performance requirements, hardware and software resources and the like.

Each storage node manager server rack 302 may have a storage node manager rack connection 314 to an interconnect 308 used to connect to the interconnection network 300. In some embodiments, the connection 314 is implemented using a network switch 303 that may include a top-of-rack Ethernet switch or any other type of network switch. In various embodiments, interconnect 308 is used to enable high-bandwidth and low-latency bulk data transfers. For example, interconnect may include a Clos network, a fat tree interconnect, an Asynchronous Transfer Mode (ATM) network, a Fast or Gigabit Ethernet and the like.

In various embodiments, the bandwidth of storage node manager rack connection 314 may be configured to enable high-bandwidth and low-latency communications between storage node managers and storage nodes located within the same or different data centers. For example, in an embodiment, the storage node manager rack connection 314 has a bandwidth of 10 Gigabit per second (Gbps).

In some embodiments, each datacenter 301 may also include one or more storage node server racks 304 where each server rack hosts one or more servers that collectively provide the functionalities of a number of storage nodes such as described in connection with FIG. 2. Configuration parameters such as number of storage nodes per rack, number of storage node racks, ration between storage node managers and storage nodes and the like may be determined based on factors such as cost, scalability, redundancy and performance requirements, hardware and software resources and the like. For example, in one embodiment, there are 3 storage nodes per storage node server rack, 30-80 racks per data center and a storage nodes/storage node manager ratio of 10 to 1.

Each storage node server rack 304 may have a storage node rack connection 316 to an interconnection network switch 308 used to connect to the interconnection network 300. In some embodiments, the connection 316 is implemented using a network switch 305 that may include a top-of-rack Ethernet switch or any other type of network switch. In various embodiments, the bandwidth of storage node rack connection 316 may be configured to enable high-bandwidth and low-latency communications between storage node managers and storage nodes located within the same or different data centers. In some embodiments, a storage node rack connection 316 has a higher bandwidth than a storage node manager rack connection 314. For example, in an embodiment, the storage node rack connection 316 has a bandwidth of 20 Gbps while a storage node manager rack connection 314 has a bandwidth of 10 Gbps.

In some embodiments, datacenters 301 (including storage node managers and storage nodes) communicate, via connection 310, with other computing resources services 306 such as payload data cache 228, storage node manager job store 240, storage node registrar 248, storage node registrar store 350, orphan cleanup data store 254, metadata manager job store 258 and the like as described in connection with FIG. 2.

In some embodiments, one or more datacenters 301 may be connected via inter-datacenter connection 312. In some embodiments, connections 310 and 312 may be configured to achieve effective operations and use of hardware resources. For example, in an embodiment, connection 310 has a bandwidth of 30-100 Gbps per datacenter and inter-datacenter connection 312 has a bandwidth of 100-250 Gbps.

Figure 4:
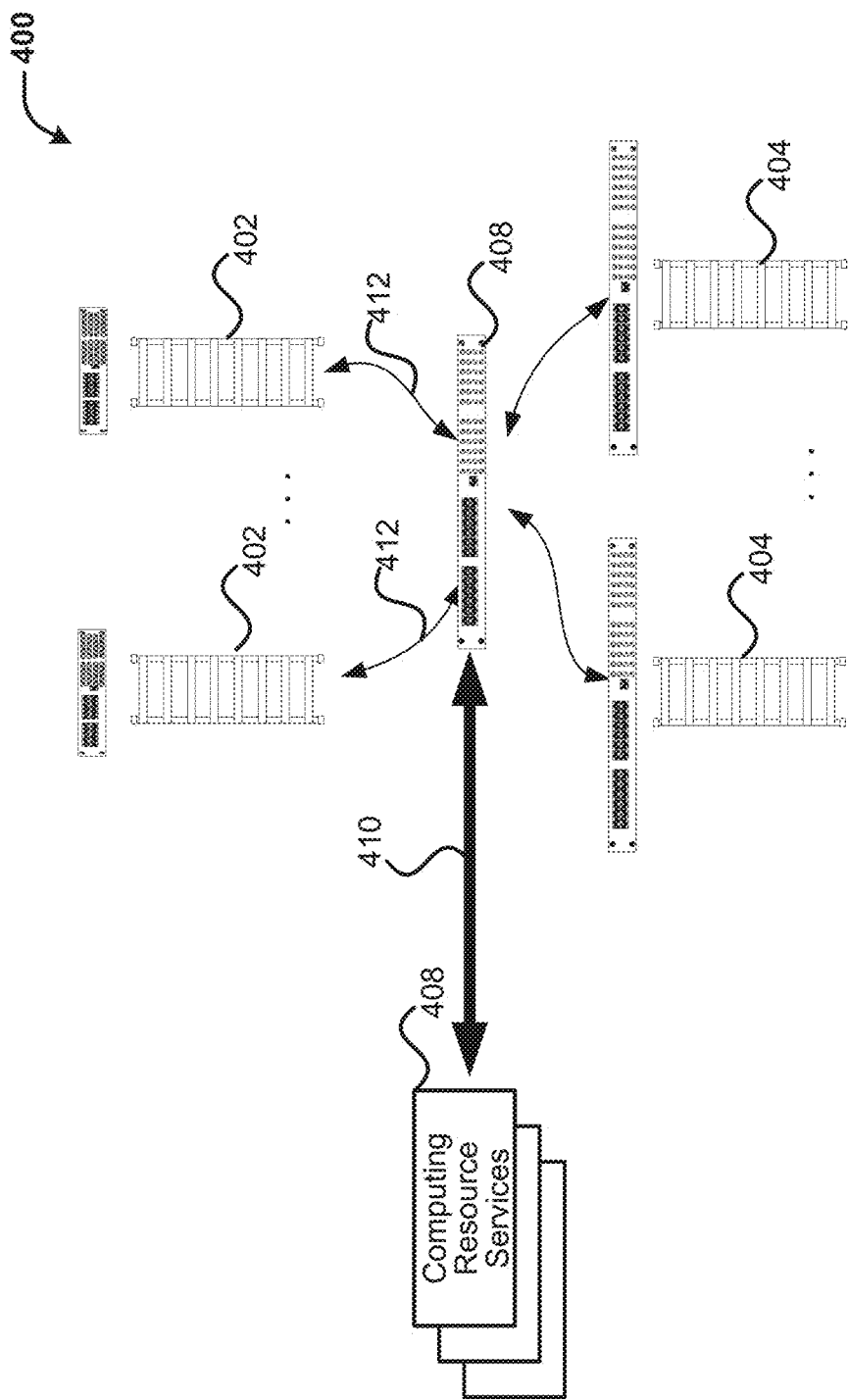
FIG. 4 illustrates an interconnection network in which components of an archival data storage system may be connected, in accordance with at least one embodiment.

FIG. 4 illustrates an interconnection network 400 in which components of an archival data storage system may be connected, in accordance with at least one embodiment. In particular, the illustrated example shows how non-data plane components are connected to the interconnection network 300. As illustrated, front end services, such as described in connection with FIG. 2, may be hosted by one or more front end server racks 402. For example, each front end server rack 402 may host one or more web servers. The front end server racks 402 may be connected 412 to the interconnection network 400 via a network switch 408. In one embodiment, configuration parameters such as number of front end services, number of services per rack, bandwidth for front end server rack connection 314 and the like may roughly correspond to those for storage node managers as described in connection with FIG. 3.

In some embodiments, control plane services and metadata plane services as described in connection with FIG. 2 may be hosted by one or more server racks 404. Such services may include job tracker 230, metadata manager 260, cleanup agent 232, job request balancer 238 and other services. In some embodiments, such services include services that do not handle frequent bulk data transfers. Finally, components described herein may communicate via connection 410, with other computing resources services 406 such as payload data cache 228, job tracker store 232, metadata manager job store 258 and the like as described in connection with FIG. 2.

Figure 5:
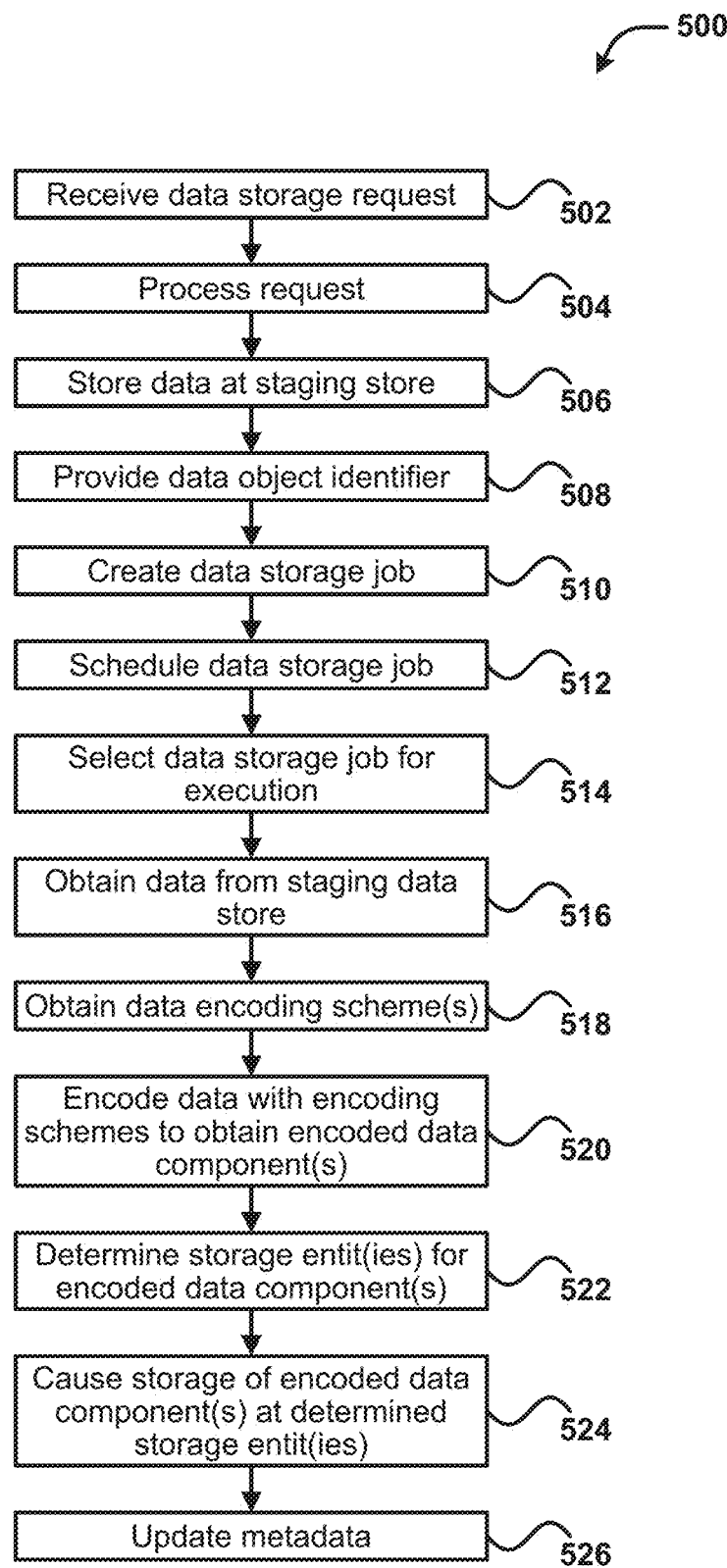
FIG. 5 illustrates an example process for storing data, in accordance with at least one embodiment.

FIG. 5 illustrates an example process 500 for storing data, in accordance with at least one embodiment. Some or all of process 500 (or any other processes described herein or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In an embodiment, one or more components of archival data storage system 206 as described in connection with FIG. 2 may perform process 500.

In an embodiment, process 500 includes receiving 502 a data storage request to store archival data such as a document, a video or audio file or the like. Such a data storage request may include payload data and metadata such as size and digest of the payload data, user identification information (e.g., user name, account identifier and the like), a logical data container identifier and the like. In some embodiments, process 500 may include receiving 502 multiple storage requests each including a portion of larger payload data. In other embodiments, a storage request may include multiple data objects to be uploaded. In an embodiment, step 502 of process 500 is implemented by a service such as API request handler 218 of front end 208 as described in connection with FIG. 2.

In an embodiment, process 500 includes processing 504 the storage request upon receiving 502 the request. Such processing may include, for example, verifying the integrity of data received, authenticating the customer, authorizing requested access against access control policies, performing meter- and accounting-related activities and the like. In an embodiment, such processing may be performed by services of front end 208 such as described in connection with FIG. 2. In an embodiment, such a request may be processed in connection with other requests, for example, in batch mode.

In an embodiment, process 500 includes storing 506 the data associated with the storage request in a staging data store. Such staging data store may include a transient data store such as provided by payload data cache 228 as described in connection with FIG. 2. In some embodiments, only payload data is stored in the staging store. In other embodiments, metadata related to the payload data may also be stored in the staging store. In an embodiment, data integrity is validated (e.g., based on a digest) before being stored at a staging data store.

In an embodiment, process 500 includes providing 508 a data object identifier associated with the data to be stored, for example, in a response to the storage request. As described above, a data object identifier may be used by subsequent requests to retrieve, delete or otherwise reference data stored. In an embodiment, a data object identifier may encode storage location information that may be used to locate the stored data object, payload validation information such as size, digest, timestamp and the like that may be used to validate the integrity of the payload data, metadata validation information such as error-detection codes that may be used to validate the integrity of metadata such as the data object identifier itself and information encoded in the data object identifier and the like. In an embodiment, a data object identifier may also encode information used to validate or authorize subsequent customer requests. For example, a data object identifier may encode the identifier of the logical data container that the data object is stored in. In a subsequent request to retrieve this data object, the logical data container identifier may be used to determine whether the requesting entity has access to the logical data container and hence the data objects contained therein. In some embodiments, the data object identifier may encode information based on information supplied by a customer (e.g., a global unique identifier, GUID, for the data object and the like) and/or information collected or calculated by the system performing process 500 (e.g., storage location information). In some embodiments, generating a data object identifier may include encrypting some or all of the information described above using a cryptographic private key. In some embodiments, the cryptographic private key may be periodically rotated. In some embodiments, a data object identifier may be generated and/or provided at a different time than described above. For example, a data object identifier may be generated and/or provided after a storage job (described below) is created and/or completed.

In an embodiment, providing 508 a data object identifier may include determining a storage location for the before the data is actually stored there. For example, such determination may be based at least in part on inventory information about existing data storage entities such as operational status (e.g., active or inactive), available storage space, data isolation requirement and the like. In an environment such as environment 200 illustrated by FIG. 2, such determination may be implemented by a service such as storage node registrar 248 as described above in connection with FIG. 2. In some embodiments, such determination may include allocating new storage space (e.g., volume) on one or more physical storage devices by a service such as storage allocator 256 as described in connection with FIG. 2.

In an embodiment, a storage location identifier may be generated to represent the storage location determined above. Such a storage location identifier may include, for example, a volume reference object which comprises a volume identifier component and data object identifier component. The volume reference component may identify the volume the data is stored on and the data object identifier component may identify where in the volume the data is stored. In general, the storage location identifier may comprise components that identify various levels within a logical or physical data storage topology (such as a hierarchy) in which data is organized. In some embodiments, the storage location identifier may point to where actual payload data is stored or a chain of reference to where the data is stored.

In an embodiment, a data object identifier encodes a digest (e.g., a hash) of at least a portion of the data to be stored, such as the payload data. In some embodiments, the digest may be based at least in part on a customer-provided digest. In other embodiments, the digest may be calculated from scratch based on the payload data.

In an embodiment, process 500 includes creating 510 a storage job for persisting data to a long-term data store and scheduling 512 the storage job for execution. In environment 200 as described in connection with FIG. 2, steps 508, 510 and 512 may be implemented at least in part by components of control plane for direct I/O 210 and common control plane 212 as described above. Specifically, in an embodiment, job tracker 230 creates a job record and stores the job record in job tracker store 232. As described above, job tracker 230 may perform batch processing to reduce the total number of transactions against job tracker store 232. Additionally, job tracker store 232 may be partitioned or otherwise optimized to facilitate parallel processing, cleanup operations and the like. A job record, as described above, may include job-related information such as a customer account identifier, job identifier, storage location identifier, reference to data stored in payload data cache 228, job status, job creation and/or expiration time and the like. In some embodiments, a storage job may be created before a data object identifier is generated and/or provided. For example, a storage job identifier, instead of or in addition to a data object identifier, may be provided in response to a storage request at step 508 above.

In an embodiment, scheduling 512 the storage job for execution includes performing job planning and optimization, such as queue-based load leveling or balancing, job partitioning and the like, as described in connection with common control plane 212 of FIG. 2. For example, in an embodiment, job request balancer 238 transfers job items from job request queue 236 to storage node manager job store 240 according to a scheduling algorithm so as to dampen peak to average load levels (jobs) coming from control plane for I/O 210 and to deliver manageable workload to data plane 214. As another example, storage node manager job store 240 may be partitioned to facilitate parallel processing of the jobs by multiple workers such as storage node managers 244. As yet another example, storage node manager job store 240 may provide querying, sorting and other functionalities to facilitate batch processing and other job optimizations.

In an embodiment, process 500 includes selecting 514 the storage job for execution, for example, by a storage node manager 244 from storage node manager job stored 240 as described in connection with FIG. 2. The storage job may be selected 514 with other jobs for batch processing or otherwise selected as a result of job planning and optimization described above.

In an embodiment, process 500 includes obtaining 516 data from a staging store, such as payload data cache 228 described above in connection with FIG. 2. In some embodiments, the integrity of the data may be checked, for example, by verifying the size, digest, an error-detection code and the like.

In an embodiment, process 500 includes obtaining 518 one or more data encoding schemes such as an encryption scheme, a redundancy encoding scheme such as erasure encoding, redundant array of independent disks (RAID) encoding schemes, replication, and the like. In some embodiments, such encoding schemes evolve to adapt to different requirements. For example, encryption keys may be rotated periodically and stretch factor of an erasure coding scheme may be adjusted over time to different hardware configurations, redundancy requirements and the like.

In an embodiment, process 500 includes encoding 520 with the obtained encoding schemes. For example, in an embodiment, data is encrypted and the encrypted data is erasure-encoded. In an embodiment, storage node managers 244 described in connection with FIG. 2 may be configured to perform the data encoding described herein. In an embodiment, application of such encoding schemes generates a plurality of encoded data components or shards, which may be stored across different storage entities such as storage devices, storage nodes, datacenters and the like to provide fault tolerance. In an embodiment where data may comprise multiple parts (such as in the case of a multi-part upload), each part may be encoded and stored as described herein.

In an embodiment, process 500 includes determining 522 the storage entities for such encoded data components. For example, in an environment 200 illustrated by FIG. 2, a storage node manager 244 may determine the plurality of storage nodes 246 to store the encoded data components by querying a storage node registrar 248 using a volume identifier. Such a volume identifier may be part of a storage location identifier associated with the data to be stored. In response to the query with a given volume identifier, in an embodiment, storage node registrar 248 returns a list of network locations (including endpoints, DNS names, IP addresses and the like) of storage nodes 246 to store the encoded data components. As described in connection with FIG. 2, storage node registrar 248 may determine such a list based on self-reported and dynamically provided and/or updated inventory information from storage nodes 246 themselves. In some embodiments, such determination is based on data isolation, fault tolerance, load balancing, power conservation, data locality and other considerations. In some embodiments, storage registrar 248 may cause new storage space to be allocated, for example, by invoking storage allocator 256 as described in connection with FIG. 2.

In an embodiment, process 500 includes causing 524 storage of the encoded data component(s) at the determined storage entities. For example, in an environment 200 illustrated by FIG. 2, a storage node manager 244 may request each of the storage nodes 246 determined above to store a data component at a given storage location. Each of the storage nodes 246, upon receiving the storage request from storage node manager 244 to store a data component, may cause the data component to be stored in a connected storage device. In some embodiments, at least a portion of the data object identifier is stored with all or some of the data components in either encoded or unencoded form. For example, the data object identifier may be stored in the header of each data component and/or in a volume component index stored in a volume component. In some embodiments, a storage node 246 may perform batch processing or other optimizations to process requests from storage node managers 244.

In an embodiment, a storage node 246 sends an acknowledgement to the requesting storage node manager 244 indicating whether data is stored successfully. In some embodiments, a storage node 246 returns an error message, when for some reason, the request cannot be fulfilled. For example, if a storage node receives two requests to store to the same storage location, one or both requests may fail. In an embodiment, a storage node 246 performs validation checks prior to storing the data and returns an error if the validation checks fail. For example, data integrity may be verified by checking an error-detection code or a digest. As another example, storage node 246 may verify, for example, based on a volume index, that the volume identified by a storage request is stored by the storage node and/or that the volume has sufficient space to store the data component.

In some embodiments, data storage is considered successful when storage node manager 244 receives positive acknowledgement from at least a subset (a storage quorum) of requested storage nodes 246. In some embodiments, a storage node manager 244 may wait until the receipt of a quorum of acknowledgement before removing the state necessary to retry the job. Such state information may include encoded data components for which an acknowledgement has not been received. In other embodiments, to improve the throughput, a storage node manager 244 may remove the state necessary to retry the job before receiving a quorum of acknowledgement.

In an embodiment, process 500 includes updating 526 metadata information including, for example, metadata maintained by data plane 214 (such as index and storage space information for a storage device, mapping information stored at storage node registrar store 250 and the like), metadata maintained by control planes 210 and 212 (such as job-related information), metadata maintained by metadata plane 216 (such as a cold index) and the like. In various embodiments, some of such metadata information may be updated via batch processing and/or on a periodic basis to reduce performance and cost impact. For example, in data plane 214, information maintained by storage node registrar store 250 may be updated to provide additional mapping of the volume identifier of the newly stored data and the storage nodes 246 on which the data components are stored, if such a mapping is not already there. For another example, volume index on storage devices may be updated to reflect newly added data components.

In common control plane 212, job entries for completed jobs may be removed from storage node manager job store 240 and added to job result queue 242 as described in connection with FIG. 2. In control plane for direct I/O 210, statuses of job records in job tracker store 232 may be updated, for example, by job tracker 230 which monitors the job result queue 242. In various embodiments, a job that fails to complete may be retried for a number of times. For example, in an embodiment, a new job may be created to store the data at a different location. As another example, an existing job record (e.g., in storage node manager job store 240, job tracker store 232 and the like) may be updated to facilitate retry of the same job.

In metadata plane 216, metadata may be updated to reflect the newly stored data. For example, completed jobs may be pulled from job result queue 242 into metadata manager job store 258 and batch-processed by metadata manager 260 to generate an updated index such as stored in cold index store 262. For another example, customer information may be updated to reflect changes for metering and accounting purposes.

Finally, in some embodiments, once a storage job is completed successfully, job records, payload data and other data associated with a storage job may be removed, for example, by a cleanup agent 234 as described in connection with FIG. 2. In some embodiments, such removal may be processed by batch processing, parallel processing or the like.

Figure 6:
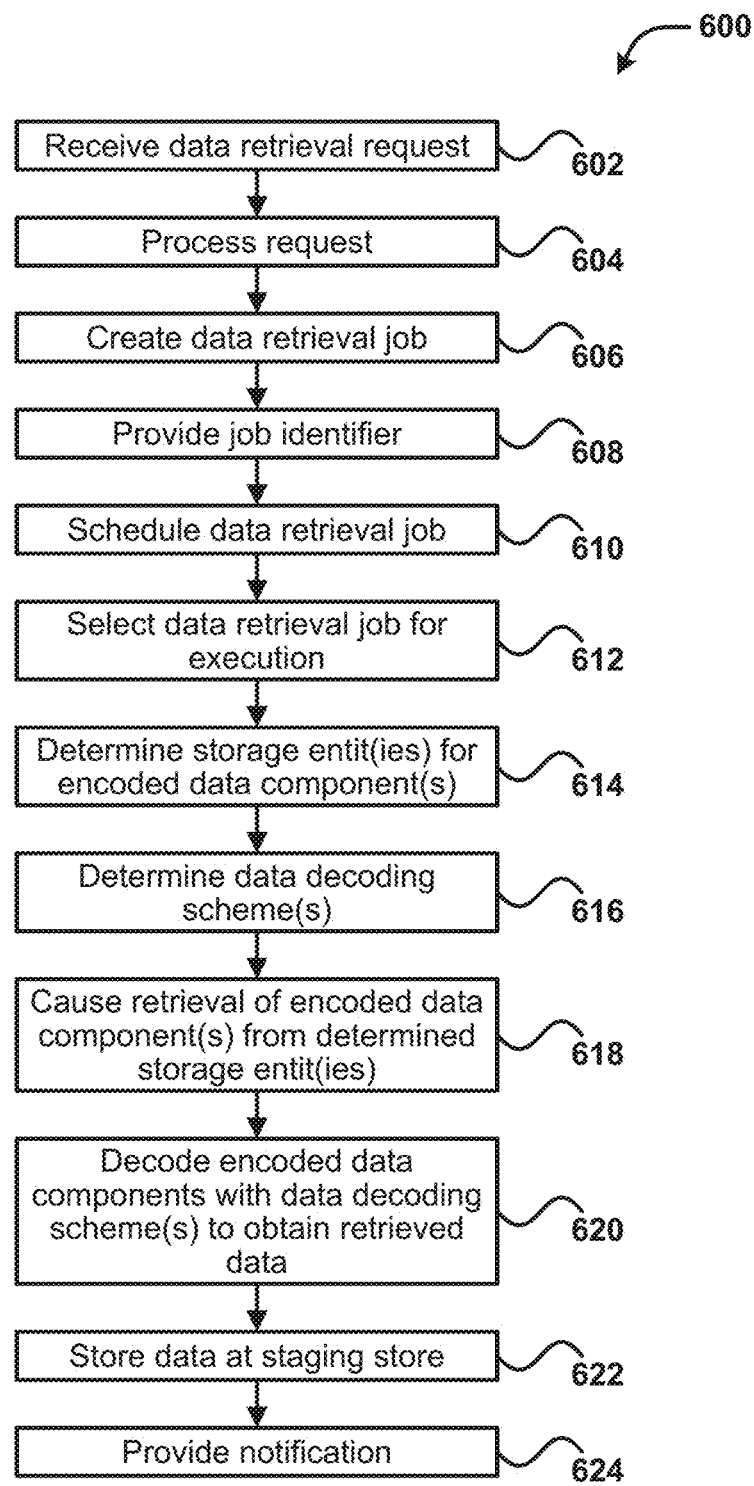
FIG. 6 illustrates an example process for retrieving data, in accordance with at least one embodiment.

FIG. 6 illustrates an example process 600 for retrieving data, in accordance with at least one embodiment. In an embodiment, one or more components of archival data storage system 206 as described in connection with FIG. 2 collectively perform process 600.

In an embodiment, process 600 includes receiving 602 a data retrieval request to retrieve data such as stored by process 500, described above. Such a data retrieval request may include a data object identifier, such as provided by step 508 of process 500, described above, or any other information that may be used to identify the data to be retrieved.

In an embodiment, process 600 includes processing 604 the data retrieval request upon receiving 602 the request. Such processing may include, for example, authenticating the customer, authorizing requested access against access control policies, performing meter and accounting related activities and the like. In an embodiment, such processing may be performed by services of front end 208 such as described in connection with FIG. 2. In an embodiment, such request may be processed in connection with other requests, for example, in batch mode.

In an embodiment, processing 604 the retrieval request may be based at least in part on the data object identifier that is included in the retrieval request. As described above, data object identifier may encode storage location information, payload validation information such as size, creation timestamp, payload digest and the like, metadata validation information, policy information and the like. In an embodiment, processing 604 the retrieval request includes decoding the information encoded in the data object identifier, for example, using a private cryptographic key and using at least some of the decoded information to validate the retrieval request. For example, policy information may include access control information that may be used to validate that the requesting entity of the retrieval request has the required permission to perform the requested access. As another example, metadata validation information may include an error-detection code such as a cyclic redundancy check ("CRC") that may be used to verify the integrity of data object identifier or a component of it.

In an embodiment, process 600 includes creating 606 a data retrieval job corresponding to the data retrieval request and providing 608 a job identifier associated with the data retrieval job, for example, in a response to the data retrieval request. In some embodiments, creating 606 a data retrieval job is similar to creating a data storage job as described in connection with step 510 of process 500 illustrated in FIG. 5. For example, in an embodiment, a job tracker 230 may create a job record that includes at least some information encoded in the data object identifier and/or additional information such as a job expiration time and the like and store the job record in job tracker store 232. As described above, job tracker 230 may perform batch processing to reduce the total number of transactions against job tracker store 232. Additionally, job tracker store 232 may be partitioned or otherwise optimized to facilitate parallel processing, cleanup operations and the like.

In an embodiment, process 600 includes scheduling 610 the data retrieval job created above. In some embodiments, scheduling 610 the data retrieval job for execution includes performing job planning and optimization such as described in connection with step 512 of process 500 of FIG. 5. For example, the data retrieval job may be submitted into a job queue and scheduled for batch processing with other jobs based at least in part on costs, power management schedules and the like. For another example, the data retrieval job may be coalesced with other retrieval jobs based on data locality and the like.

In an embodiment, process 600 includes selecting 612 the data retrieval job for execution, for example, by a storage node manager 244 from storage node manager job stored 240 as described in connection with FIG. 2. The retrieval job may be selected 612 with other jobs for batch processing or otherwise selected as a result of job planning and optimization described above.

In an embodiment, process 600 includes determining 614 the storage entities that store the encoded data components that are generated by a storage process such as process 500 described above. In an embodiment, a storage node manager 244 may determine a plurality of storage nodes 246 to retrieve the encoded data components in a manner similar to that discussed in connection with step 522 of process 500, above. For example, such determination may be based on load balancing, power conservation, efficiency and other considerations.

In an embodiment, process 600 includes determining 616 one or more data decoding schemes that may be used to decode retrieved data. Typically, such decoding schemes correspond to the encoding schemes applied to the original data when the original data is previously stored. For example, such decoding schemes may include decryption with a cryptographic key, erasure-decoding and the like.

In an embodiment, process 600 includes causing 618 retrieval of at least some of the encoded data components from the storage entities determined in step 614 of process 600. For example, in an environment 200 illustrated by FIG. 2, a storage node manager 244 responsible for the data retrieval job may request a subset of storage nodes 246 determined above to retrieve their corresponding data components. In some embodiments, a minimum number of encoded data components is needed to reconstruct the original data where the number may be determined based at least in part on the data redundancy scheme used to encode the data (e.g., stretch factor of an erasure coding). In such embodiments, the subset of storage nodes may be selected such that no less than the minimum number of encoded data components is retrieved.

Each of the subset of storage nodes 246, upon receiving a request from storage node manager 244 to retrieve a data component, may validate the request, for example, by checking the integrity of a storage location identifier (that is part of the data object identifier), verifying that the storage node indeed holds the requested data component and the like. Upon a successful validation, the storage node may locate the data component based at least in part on the storage location identifier. For example, as described above, the storage location identifier may include a volume reference object which comprises a volume identifier component and a data object identifier component where the volume reference component to identify the volume the data is stored and a data object identifier component may identify where in the volume the data is stored. In an embodiment, the storage node reads the data component, for example, from a connected data storage device and sends the retrieved data component to the storage node manager that requested the retrieval. In some embodiments, the data integrity is checked, for example, by verifying the data component identifier or a portion thereof is identical to that indicated by the data component identifier associated with the retrieval job. In some embodiments, a storage node may perform batching or other job optimization in connection with retrieval of a data component.

In an embodiment, process 600 includes decoding 620, at least the minimum number of the retrieved encoded data components with the one or more data decoding schemes determined at step 616 of process 600. For example, in one embodiment, the retrieved data components may be erasure decoded and then decrypted. In some embodiments, a data integrity check is performed on the reconstructed data, for example, using payload integrity validation information encoded in the data object identifier (e.g., size, timestamp, digest). In some cases, the retrieval job may fail due to a less-than-minimum number of retrieved data components, failure of data integrity check and the like. In such cases, the retrieval job may be retried in a fashion similar to that described in connection with FIG. 5. In some embodiments, the original data comprises multiple parts of data and each part is encoded and stored. In such embodiments, during retrieval, the encoded data components for each part of the data may be retrieved and decoded (e.g., erasure-decoded and decrypted) to form the original part and the decoded parts may be combined to form the original data.

In an embodiment, process 600 includes storing reconstructed data in a staging store such as payload data cache 228 described in connection with FIG. 2. In some embodiments, data stored 622 in the staging store may be available for download by a customer for a period of time or indefinitely. In an embodiment, data integrity may be checked (e.g., using a digest) before the data is stored in the staging store.

In an embodiment, process 600 includes providing 624 a notification of the completion of the retrieval job to the requestor of the retrieval request or another entity or entities otherwise configured to receive such a notification. Such notifications may be provided individually or in batches. In other embodiments, the status of the retrieval job may be provided upon a polling request, for example, from a customer.

Figure 7:
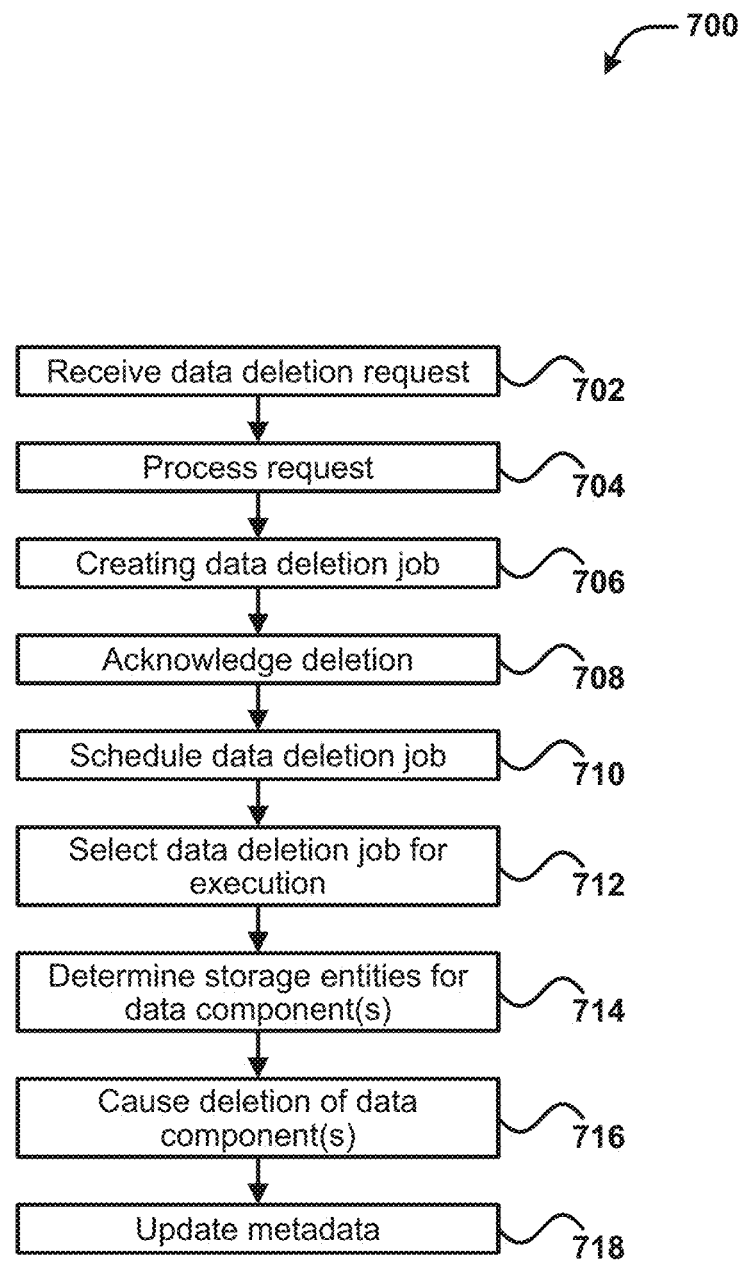
FIG. 7 illustrates an example process for deleting data, in accordance with at least one embodiment.

FIG. 7 illustrates an example process 700 for deleting data, in accordance with at least one embodiment. In an embodiment, one or more components of archival data storage system 206 as described in connection with FIG. 2 collectively perform process 700.

In an embodiment, process 700 includes receiving 702 a data deletion request to delete data such as stored by process 500, described above. Such a data retrieval request may include a data object identifier, such as provided by step 508 of process 500, described above, or any other information that may be used to identify the data to be deleted.

In an embodiment, process 700 includes processing 704 the data deletion request upon receiving 702 the request. In some embodiments, the processing 704 is similar to that for step 504 of process 500 and step 604 of process 600, described above. For example, in an embodiment, the processing 704 is based at least in part on the data object identifier that is included in the data deletion request.

In an embodiment, process 700 includes creating 706 a data retrieval job corresponding to the data deletion request. Such a retrieval job may be created similar to the creation of storage job described in connection with step 510 of process 500 and the creation of the retrieval job described in connection with step 606 of process 600.

In an embodiment, process 700 includes providing 708 an acknowledgement that the data is deleted. In some embodiments, such acknowledgement may be provided in response to the data deletion request so as to provide a perception that the data deletion request is handled synchronously. In other embodiments, a job identifier associated with the data deletion job may be provided similar to the providing of job identifiers for data retrieval requests.

In an embodiment, process 700 includes scheduling 708 the data deletion job for execution. In some embodiments, scheduling 708 of data deletion jobs may be implemented similar to that described in connection with step 512 of process 500 and in connection with step 610 of process 600, described above. For example, data deletion jobs for closely-located data may be coalesced and/or batch processed. For another example, data deletion jobs may be assigned a lower priority than data retrieval jobs.

In some embodiments, data stored may have an associated expiration time that is specified by a customer or set by default. In such embodiments, a deletion job may be created 706 and schedule 710 automatically on or near the expiration time of the data. In some embodiments, the expiration time may be further associated with a grace period during which data is still available or recoverable. In some embodiments, a notification of the pending deletion may be provided before, on or after the expiration time.

In some embodiments, process 700 includes selecting 712 the data deletion job for execution, for example, by a storage node manager 244 from storage node manager job stored 240 as described in connection with FIG. 2. The deletion job may be selected 712 with other jobs for batch processing or otherwise selected as a result of job planning and optimization described above.

In some embodiments, process 700 includes determining 714 the storage entities for data components that store the data components that are generated by a storage process such as process 500 described above. In an embodiment, a storage node manager 244 may determine a plurality of storage nodes 246 to retrieve the encoded data components in a manner similar to that discussed in connection with step 614 of process 600 described above.

In some embodiments, process 700 includes causing 716 the deletion of at least some of the data components. For example, in an environment 200 illustrated by FIG. 2, a storage node manager 244 responsible for the data deletion job may identify a set of storage nodes that store the data components for the data to be deleted and requests at least a subset of those storage nodes to delete their respective data components. Each of the subset of storage node 246, upon receiving a request from storage node manager 244 to delete a data component, may validate the request, for example, by checking the integrity of a storage location identifier (that is part of the data object identifier), verifying that the storage node indeed holds the requested data component and the like. Upon a successful validation, the storage node may delete the data component from a connected storage device and sends an acknowledgement to storage node manager 244 indicating whether the operation was successful. In an embodiment, multiple data deletion jobs may be executed in a batch such that data objects located close together may be deleted as a whole. In some embodiments, data deletion is considered successful when storage node manager 244 receives positive acknowledgement from at least a subset of storage nodes 246. The size of the subset may be configured to ensure that data cannot be reconstructed later on from undeleted data components. Failed or incomplete data deletion jobs may be retried in a manner similar to the retrying of data storage jobs and data retrieval jobs, described in connection with process 500 and process 600, respectively.

In an embodiment, process 700 includes updating 718 metadata information such as that described in connection with step 526 of process 500. For example, storage nodes executing the deletion operation may update storage information including index, free space information and the like. In an embodiment, storage nodes may provide updates to storage node registrar or storage node registrar store. In various embodiments, some of such metadata information may be updated via batch processing and/or on a periodic basis to reduce performance and cost impact.

As noted above, embodiments of the present disclosure utilize an API that provides numerous advantages over conventional APIs used for data storage management. FIGS. 8-11 are graphic representations of API calls that may be made in accordance with various embodiments of the present disclosure and responses that may be provided. The calls may be made by customers 102, 202, described above, and the responses may be made by a data storage service, such as the archival data storage service described above. Responses may be transmitted electronically using various protocols mentioned herein (or other suitable protocols) and may, for instance, be transmitted from the front end 208 described above in connection with FIG. 2. In addition, while each of FIGS. 8-11 illustrate particular collections of information that may be included in API calls and responses, variations are within the scope of the present disclosure. For example, any of the illustrated API calls may have fewer or more informational components and, as noted below, many components may be context dependent. For instance, in some embodiments, not all API calls made using the same API component may include the same informational components. The type and/or existence of non-trivial information for one parameter may, for example, depend on the value of another parameter. Similarly, the type and/or existence of non-trivial information for a component of a response may depend on the value of another parameter and/or a parameter of an API call that triggered the response.

Figure 8:
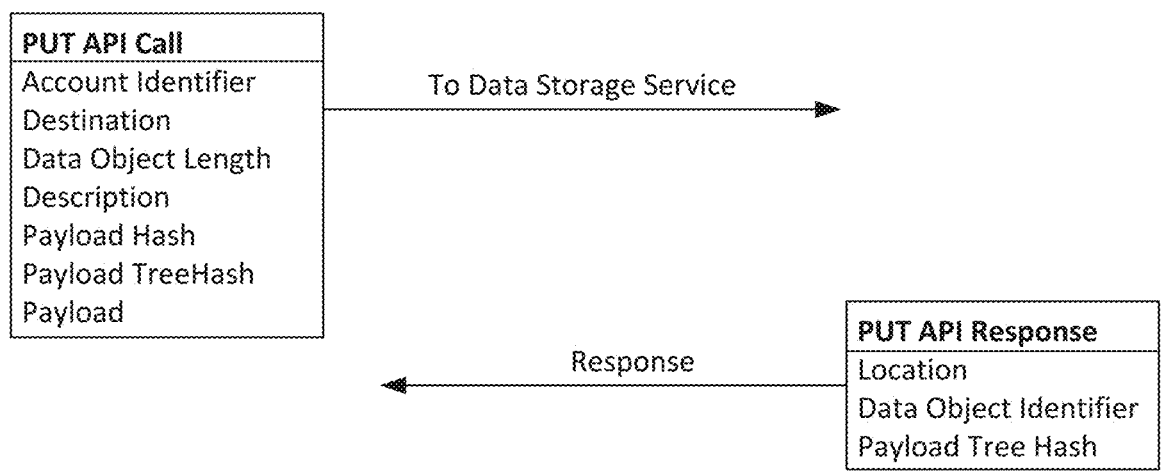
FIG. 8 illustrates graphical representations of an example API call for uploading data and a response, in accordance with at least one embodiment.

Turning to the specific figures, FIG. 8 shows a graphic representation of a PUT API call, such as described above. As illustrated in FIG. 8, a PUT API call may specify one or more parameters for the call. In this example, the parameters include an account identifier, a destination, a data object length, a description, a payload hash, and a payload tree hash. A payload (e.g. the data to be stored) may also be provided, such as in a REST request body. The payload may be, as an example, a portion or all of a data object. If only a portion of a data object, the payload may be uploaded in a manner similar to the manner in which it is downloaded, as described below. Further, if only a portion of a data object (or other collection of data), the PUT API call may include both a tree hash of the payload and a tree hash of the complete data object so that the payload may be verified after transmission and that the data object may be verified once all of its parts have been transmitted.

The account identifier may be an identifier of an account with the data storage service (or an organization that manages the data storage service). The data storage service may utilize the account identifier for the purpose of accounting, authorization, policy enforcement, and the like. The destination may be information that encodes a logical location for a data object to be stored. For example, when an API is used in connection with an archival data storage service, such as described above in connection with FIGS. 2-7, the destination may encode a logical data container identifier. The archival data storage system may then process a corresponding job so that an uploaded data object is associated with the specified logical data container identifier.

The data object length may be the size of the data object to be stored as a result of a PUT API call. The data object length may be specified in bytes, although other ways of specifying data object size may be used. The description may be an optional parameter that allows a user (or computer system) of the customer to provide information about the data object being uploaded. The description may include, for instance, an identifier used by the customer to identify the data object, which may be different from an identifier used by a data storage service that stores the data object. In some embodiments, the description can be any information the customer desires. The customer may, for example, include information in a format that is recognized by a customer computer system to enable the customer computer system to later process information in the description per the customer's needs.

The payload hash may be a value calculated based at least in part on the data object to be uploaded using the PUT API call. Similarly, the payload tree hash may be a tree hash of the data object to be uploaded. The payload hash and/or payload tree hash may be used by a data storage service to determine whether the payload, when uploaded, was uploaded correctly. If one or both of the payload hash and/or payload tree hash do not match what the customer provided, the customer may attempt again to upload the payload. The tree hash of a data object may be computed, by both the customer and the data storage service, by partitioning the data object into portions of a predefined size, e.g. 1 MB (with potentially one portion being of a different size less than the predefined size when the data object has a size that is not an integer multiple of the predefined size). The tree hash may be computed, for example, using conventional techniques. The tree hash may be a top level value in a tree hash, a data structure encoding hashes in a hash tree, leaves of a hash tree, and/or any other suitable information.

Data objects, in some embodiments, may be uploaded in parts. Accordingly, in an embodiment, PUT API calls may include additional parameters, such as a part size. In an embodiment, a data storage service is configured to only accept part sizes (for non-terminal parts) that are a predefined size (e.g. 1 MB) or an integer multiple thereof. In this manner, a technical advantage is achieved in that a tree hash will be consistent regardless of whether a data object is uploaded in parts of the predefined size or integer multiples thereof.

As noted, FIG. 8 also shows a response to a PUT API call. In this illustrative example, the response includes a location, a data object identifier and a payload tree hash. The location may be, in some embodiments, a relative URI path of the data object. The data object identifier may be an identifier of the data object, such as described above. As noted above, the data object identifier may be provided in the response from a data storage service before the data storage service persistently stores the data object, thereby making the response synchronous from the perspective of the customer, but asynchronous from the point of view of implementation. The tree hash may be a tree hash of the data object computed by the storage service. The customer receiving the response may, for instance, compare the tree hash with a tree hash independently computed to ensure that the data object was uploaded correctly. In the case of multi-part upload of data objects, a response may include a tree hash or other hash of the payload of a particular part uploaded using the call that prompted the response.

Figure 9:
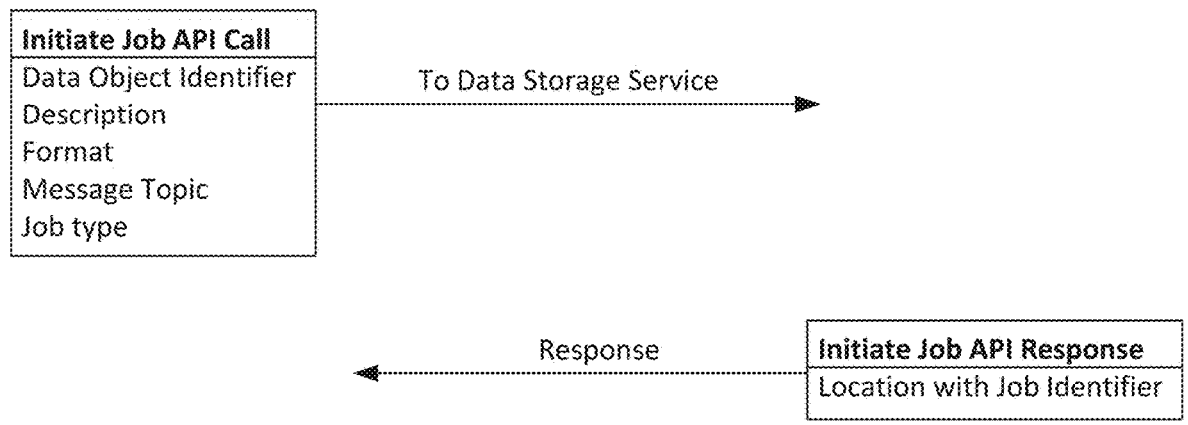
FIG. 9 illustrates graphical representations of an example API call for initiating a job and a response, in accordance with at least one embodiment.

As discussed, various embodiments of the present disclosure utilize a notion of a job. Accordingly, in accordance with various embodiments of the disclosure, customers are able to utilize an API to initiate various types of jobs. FIG. 9 shows an illustrative example of a graphic representation of an API call to initiate a job. As illustrated, the initiate job API call includes one or more parameters. In this example, the parameters are a data object identifier, a description, a format, a message topic, and a job type. The data object identifier may be an identifier of a data object with which the job is to be associated and may be an identifier such as described above in connection with FIGS. 2-7. The description may be an optional parameter to allow a customer to provide information about the job to be initiated by the API call, such as the description parameter in the PUT API call described above.

A message topic parameter, in an embodiment, is information that specifies a topic of potential future notifications. For example, a topic may correspond to a data object having been retrieved from persistent storage and ready for download by a customer. In an embodiment, a data storage service or another service communicates with a message service. The message service may allow configuration of topics to which customer computer systems can subscribe to. A topic may correspond to one or more events, such as a data object becoming available for download or an inventory being ready for retrieval. In embodiments where an initiate job API call includes a message topic, the data storage service may, at an appropriate time, notify the message service which, in turn, notifies any subscribers to the message topic. The notifications from the message service may take any suitable form, such as email, short message service messages and/or any suitable method of communication, which may be selectable by subscribers. The storage service may notify the message service at any appropriate time, such as when a job is completed, a job fails, one or more customer-defined or other criteria are met in connection with a job and the like.

A format parameter, in an embodiment, is a parameter that specifies a format for an output of a job. The format parameter may only be used for certain job types. As an example, if a job is to obtain a list of data objects in a logical data container, the format parameter may specify a format for the list, such as comma separated values (CSV) or JavaScript Object Notation (JSON). The formats may be selected from a predetermined set of formats in which a data storage service may provide job output. In some embodiments, such as where a job is completed synchronously, the format may also be used to specify a format for a response to an initiate job API call.

As noted, there may be multiple types of jobs. As an example, retrieval of a data object may correspond to one job type while retrieval and/or generation of an inventory of a logical data container may correspond to another job type. While data object retrieval and inventory of a logical data container are described herein, the scope of the present disclosure is not limited to such job types. Additional types may be specified in addition to or instead of data object retrieval or logical data container inventory.

In an embodiment, when a data storage service receives an initiate job API call, the service processes the API call according to the job type parameter specified in the call. Examples are described in greater detail below.

Figure 10:
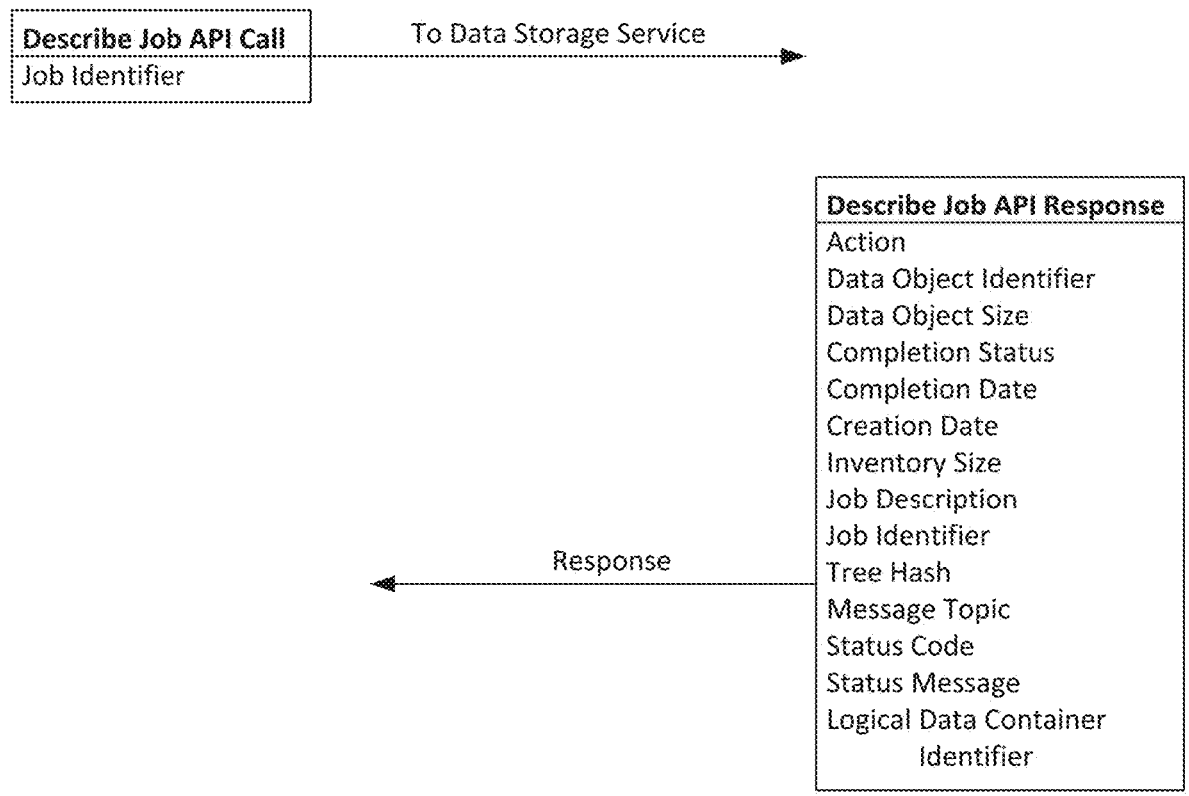
FIG. 10 illustrates graphical representations of an example API call for obtaining information about a job and a response, in accordance with at least one embodiment.

As noted above, embodiments of the present disclosure allow a customer to obtain the status of a pending job, such as the status of a data object retrieval request or the status of a request for an inventory of a logical data container. FIG. 10, accordingly, shows a graphical representation of an illustrative example of an API call to obtain information about a pending job. In an embodiment, a describe job API call includes a job identifier, which may be an identifier for a job as described above. In response to a request made pursuant to the describe job API call, a data storage service may provide a response comprising one or more pieces of information. For example, in the illustrative example of FIG. 10, a response may include an action, a data object identifier, a data object size, a completion status, a completion date, a creation date, an inventory size, a job description, a job identifier, a tree hash of a data object corresponding to the job (e.g. a data object to be retrieved as part of completion of the job), a message topic, a status code, a status message and/or a logical data container identifier.

The action may be information specifying a job type, where the job type is as described above. The data object identifier, data object size, job description, job identifier, tree hash, message topic and/or logical data container identifier may be as described above. The completion status includes information that indicates whether a job with the job identifier has been completed. The completion status may, for example, be a Boolean value corresponding to whether the associated job has been completed. The completion date may be a value that encodes a time (which may be relative to a clock used as a universal time keeper) that the job was completed. If the completion status indicates that the job has not been completed, a response to a describe job API call may not include a completion status and, generally, information in responses may be context-dependent. Similar to a completion date, a creation date may encode a time at which the associated job was created, which may closely correspond to a time when a describe job API call was made. A status code may be similar to a completion status and, therefore, may indicate a status of an associated job. The status code, in an embodiment, encodes whether the job is in progress, completed, or failed. Other statuses are also within the scope of the present disclosure. The status message, similar to the completion status and/or status code, may provide information about the status of an associated job. The status message may, for instance, be a predefined string, the value of which depends on context, e.g. whether the job is in progress, failed or has another status. The status message may provide a human-understandable phrase, such as "the job has failed." The status message may also, in some embodiments, give more information than the completion status and/or status code. As one example, the status message may include information encoding an estimate of when a pending job will be completed, information indicating how much of the job has been completed and/or other information relevant to a job's status.

As noted, values in the response to a describe job API call may be context dependent. Some information may be omitted or have a null value, for instance, if the information is not relevant to the particular job. As an example, a response may include an inventory size when the job type is one for inventory retrieval. Such a response may exclude a size of a data object. Similarly, a response to a describe job API call for a data object retrieval job may include a size of a corresponding data object, but not the size of any inventory. Other examples and variations are considered as being within the scope of the present disclosure.

Figure 11:
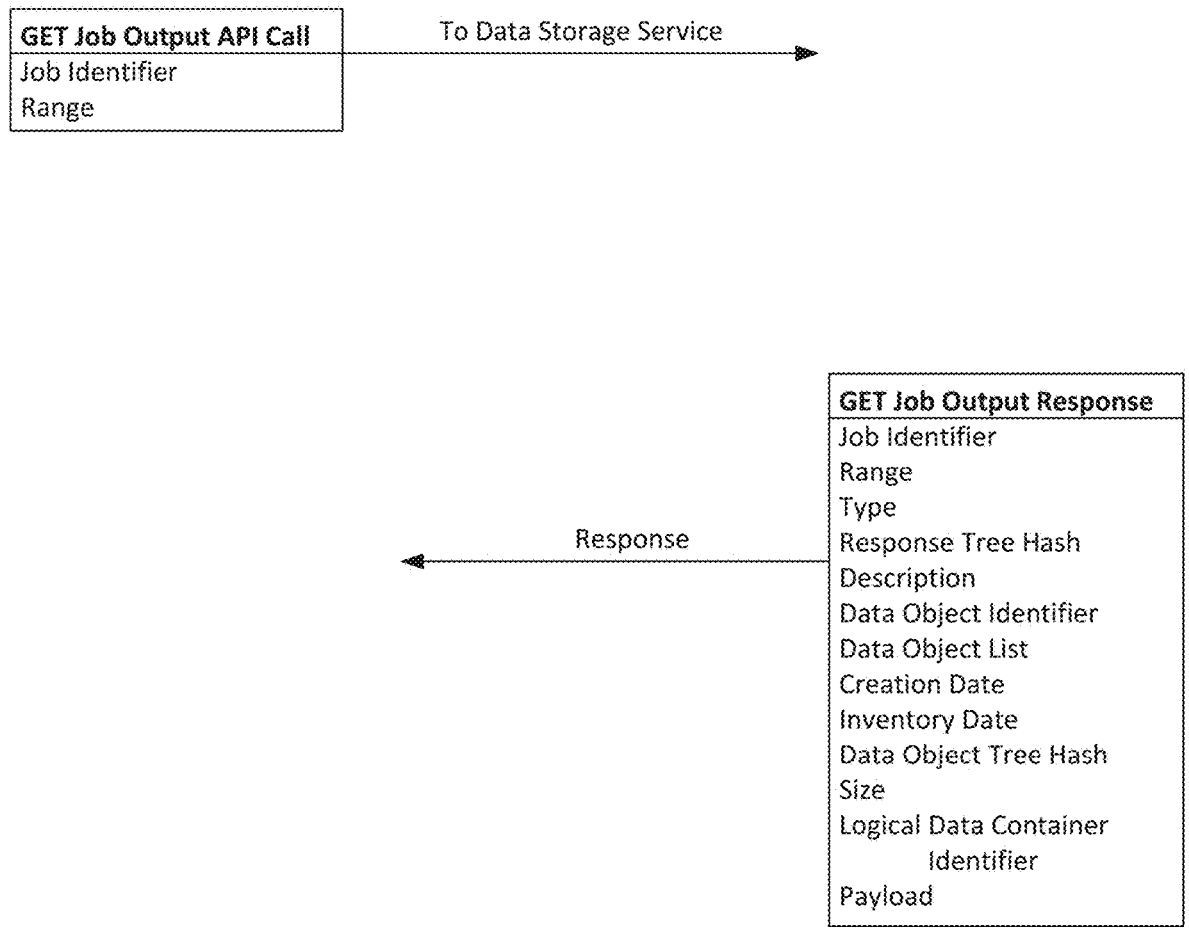
FIG. 11 illustrates graphical representations of an example API call for obtaining the output of a job and a response, in accordance with at least one embodiment.

As discussed, various embodiments of the present disclosure incorporate asynchronous request processing in order to achieve technical advantages. Accordingly, in an embodiment, an API for a data storage service allows customers to obtain the output of jobs in an asynchronous manner. FIG. 11, for example, shows a graphical representation of an illustrative example of an API call for getting the output of a job, i.e. a GET job output API call. As illustrated in FIG. 11, the GET job output API call may include one or more parameters. As shown, the GET job output API call includes a job identifier, such as described above, and a range. Because data objects may be very large, e.g. on the order of gigabytes and/or terabytes, downloading data objects from a storage service to a customer over a network may be difficult. With larger downloads there may be a larger chance that a download was unsuccessful and, as a result, the download may have to be performed from the beginning. Depending on bandwidth, restarting a download may cause significant delay in obtaining data.

Accordingly, the range parameter, in an embodiment, allows customers to download data objects (or other information, such as inventories) in parts. Instead of using the GET job output API call to request a complete data object, for example, multiple API calls can be used to download the data object in parts. The range, therefore, in a GET job output API call, may specify a range of bytes for the part to be downloaded. In some embodiments, customers may specify any value for the range. Also, lack of a specified range may indicate to a data storage system a request to download a complete object (i.e. not in parts). In other embodiments, GET job output API calls are required by a data storage service to specify only certain ranges for the calls to be successfully processed, i.e. for the data storage service to respond with data for the requested range. In an embodiment, a data storage system requires the range of bytes to have a length of an integer to an integer power (e.g. 2N, where N is an integer) times a base size (e.g. 1 MB). For instance, a data storage service may require the range to have a length of 2N*1 MB. Such restrictions provide for technical advantages. For example, using the example of multiples of 2 with a basis of 1 MB, binary hash trees may be computed by partitioning data into 1 MB partitions and building the hash trees from the partitions. In this manner, regardless of whether operations on data are performed using 1 MB partitions, 2 MB partitions, 4 MB partitions or the like, a top level of a hash tree will be the same. Thus, if a customer uploads data in 1 MB partitions (with a last portion of data having potentially less than 1 MB of data), but later downloads the data in 8 MB partitions (with a last portion of data having potentially less than 8 MB), a top level hash used to verify data after an operation (e.g. transfer over a network) will be the same.

Turning to the response illustrated in FIG. 11, multiple types of information may be provided, some of which may be context dependent (i.e. dependent on the type of job for which output is requested). In this example, a response to a GET job output API call may have a range, type, response tree hash, description, data object identifier, data object list, creation date, inventory date, data object tree hash, size and logical data container identifier, and a payload (e.g. the data object being downloaded or part thereof, an inventory of a logical data container and, generally, any information that may be provided as part of a payload in accordance with the various embodiments). Assuming a proper response (e.g. without malfunction or error), the range may equal the range of the GET job output API call that prompted the response. The type may specify the type of job, such as described above. The response tree hash may be a tree hash of a response payload, such as a data object or a portion of the data object when downloaded in parts. The description, data object identifier, data object list, creation date, inventory date, data object tree hash, size and logical data container identifier may be as described above. For example, the inventory date may be the date an inventory was generated and the size may be the size of a data object requested.

Figure 12:
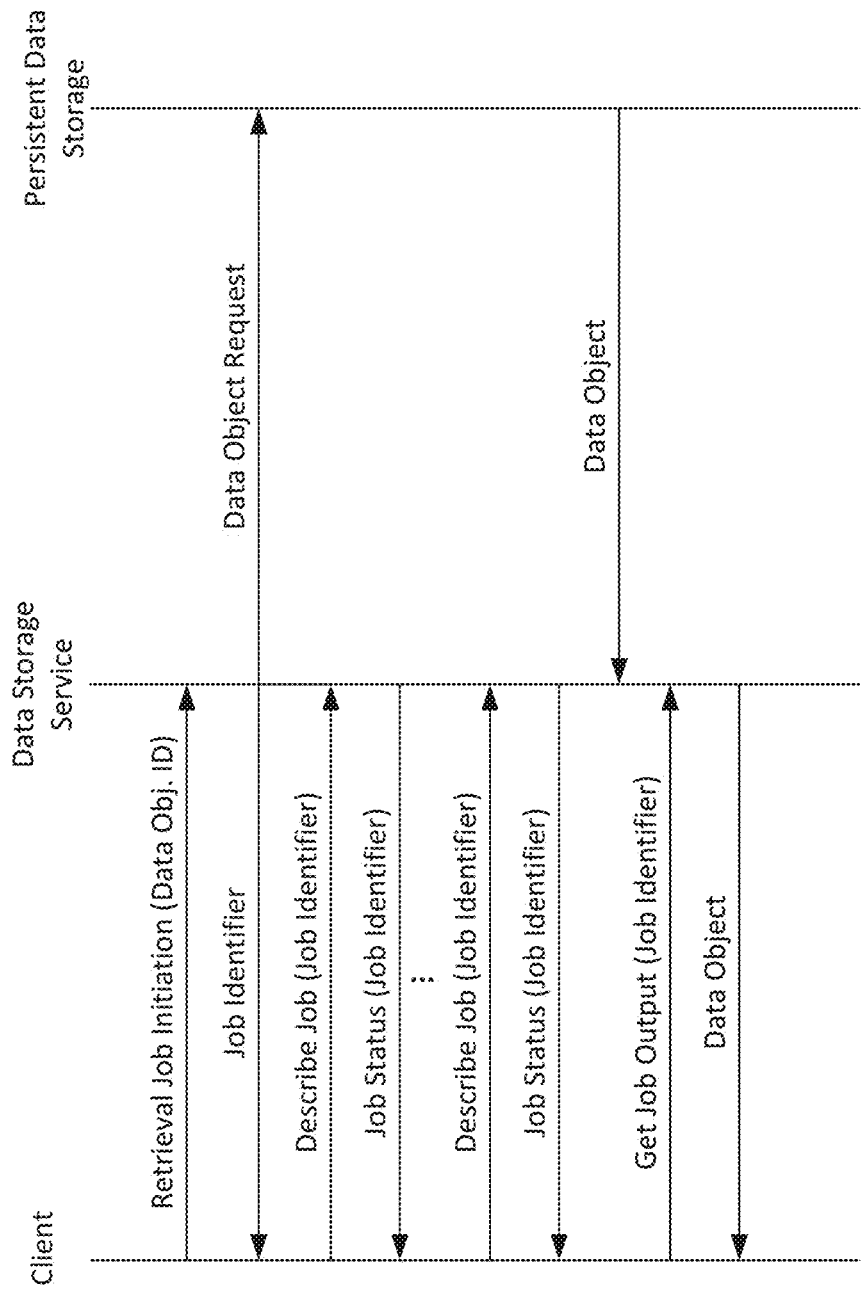
FIG. 12 illustrates a graphical representation of a process for using an API of a data storage service to obtain a data object, in accordance with at least one embodiment.

FIG. 12 shows an illustrative example of an information flow diagram illustrating a manner in which a storage service API may be used in accordance with various embodiments. In particular, FIG. 12 shows a manner in which data may be obtained from a data storage service in accordance with an embodiment. As illustrated, a client of the storage service (e.g. customer, such as described above) submits an electronic request to initiate a retrieval job, such as by using an initiate job API call that has appropriate parameters, such as a data object identifier of a data object to be retrieved. While not illustrated as such for the purpose of illustration, the retrieval job may specify a range of bytes for a part of a data object.

In response to a retrieval job initiation, the data storage service may provide the client a job identifier that identifies the retrieval job. In addition, the data storage service may submit a data object request to a subsystem to retrieve the data object from persistent storage, such as described above in connection with FIGS. 2-7. As shown, the job identifier is provided prior to providing the data object to the client. Also, it should be noted that the job identifier may be provided to the client before the data object request is submitted to the subsystem, after the data object request is submitted to the subsystem or at the same time. In addition, while drawn separately in FIG. 12 (as well as in FIGS. 13-14) for illustrative purposes, the persistent data storage may be part of the data storage service. Additionally, the persistent data storage may be separate (e.g. hosted by a third party relative to the data storage service) and, in some embodiments, fulfilling a request for information (e.g. a data object or an inventory) may involve obtaining information from both local sources as well as third party sources.

In this illustrated example, the client receives the job identifier and uses the job identifier to poll the data storage service for job status. For example, as shown, the client may submit a describe job API call that specifies the job identifier and an appropriate response may be generated and transmitted to the client, such as described above. The client may submit such describe job API calls until a status is returned that indicates that the job has completed, such as when the data storage service has retrieved the data object from persistent data storage and moved the data object into storage from which the data object can be transmitted to the client. When the job has completed, the client may submit a GET job output API call that specifies the job identifier and, in response, the data storage service may provide the data object. While not illustrated as such, the client may also submit GET job output API calls with ranges of bytes for parts of the data object and the data storage service may provide the parts in response accordingly.

Figure 13:
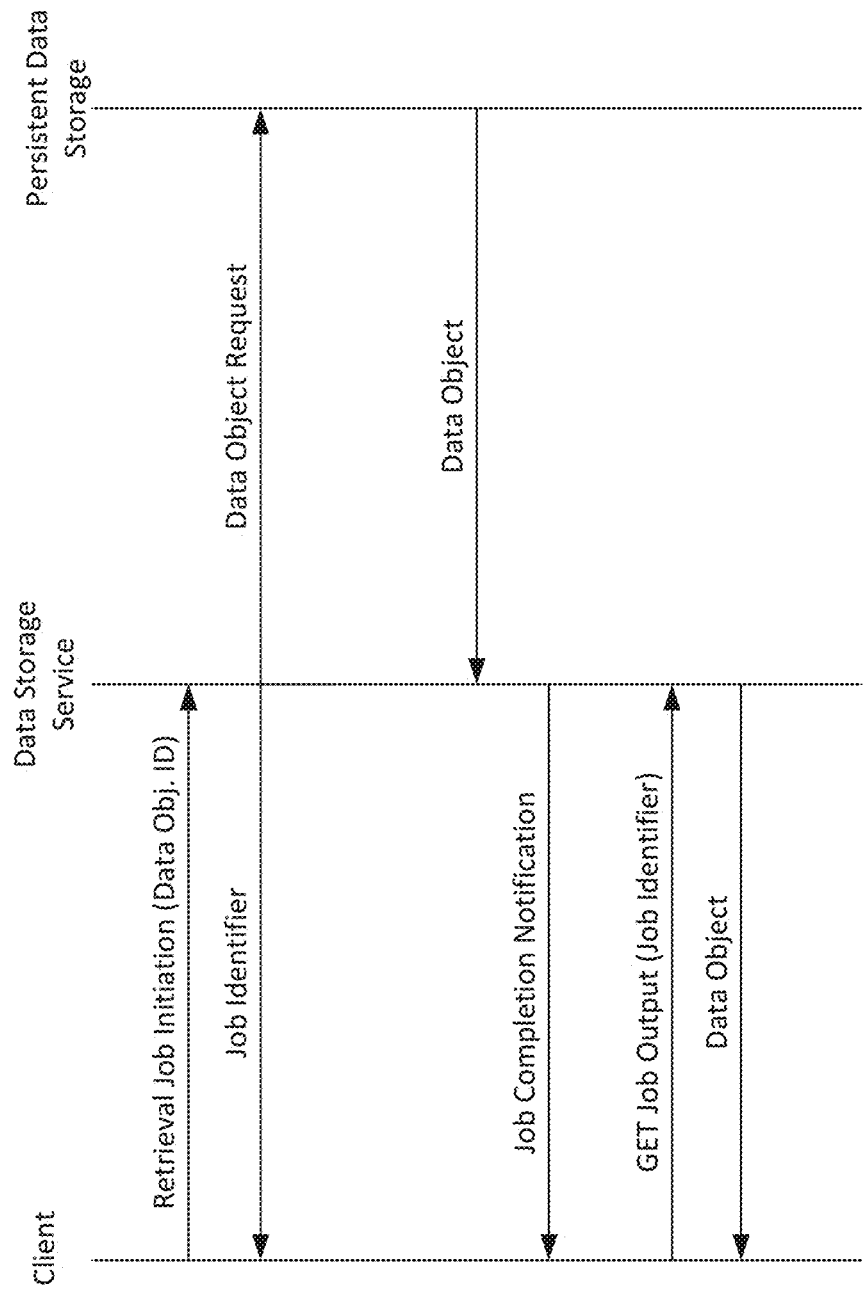
FIG. 13 illustrates a graphical representation of a process for using an API of a data storage service to obtain a data object, in accordance with at least one embodiment.

FIG. 13 shows an illustrative example of an information flow diagram illustrating a manner in which a storage service API may be used in accordance with various embodiments. In particular, FIG. 13 shows a manner in which data may be obtained from a data storage service upon receipt of a notification, in accordance with an embodiment. As illustrated, a client of the storage service (e.g. customer, such as described above) submits an electronic request to initiate a retrieval job, such as by using an initiate job API call that has appropriate parameters, such as a data object identifier of a data object to be retrieved. While not illustrated as such for the purpose of illustration, the retrieval job may specify a range of bytes for a part of a data object.

In response to a retrieval job initiation, the data storage service may provide the client a job identifier that identifies the retrieval job. In addition, the data storage service may submit a data object request to a subsystem to retrieve the data object from persistent storage, such as described above in connection with FIGS. 2-7. As shown in FIG. 13, the job identifier is provided prior to providing the data object to the client. Also, it should be noted that the job identifier may be provided to the client before the data object request is submitted to the subsystem, after the data object request is submitted to the subsystem or at the same time.

In this example, instead of polling the data storage service, the client has used the API to specify that a notification should be sent (e.g. to the client or to another location specified by the client). The client may have specified a message topic in an initiate job API call, such as described above. In an embodiment, once the data storage service receives the requested data object from persistent data storage, the data storage service (or a messaging service separate from the data storage service but working in connection with the data storage service) sends a job completion notification to the client (and/or location(s) specified by the client). The client then, upon receipt of the job completion notification, may submit a GET job output API call specifying the job identifier, as described above, to receive the data object (or part thereof should the GET job output API call specify a range for the part). The client may, for example, be configured to process the notification and, as a result, automatically submit the GET job output API call. The client may also manually (i.e. triggered on user input) submit the GET job output API call in response to user instructions.

Figure 14:
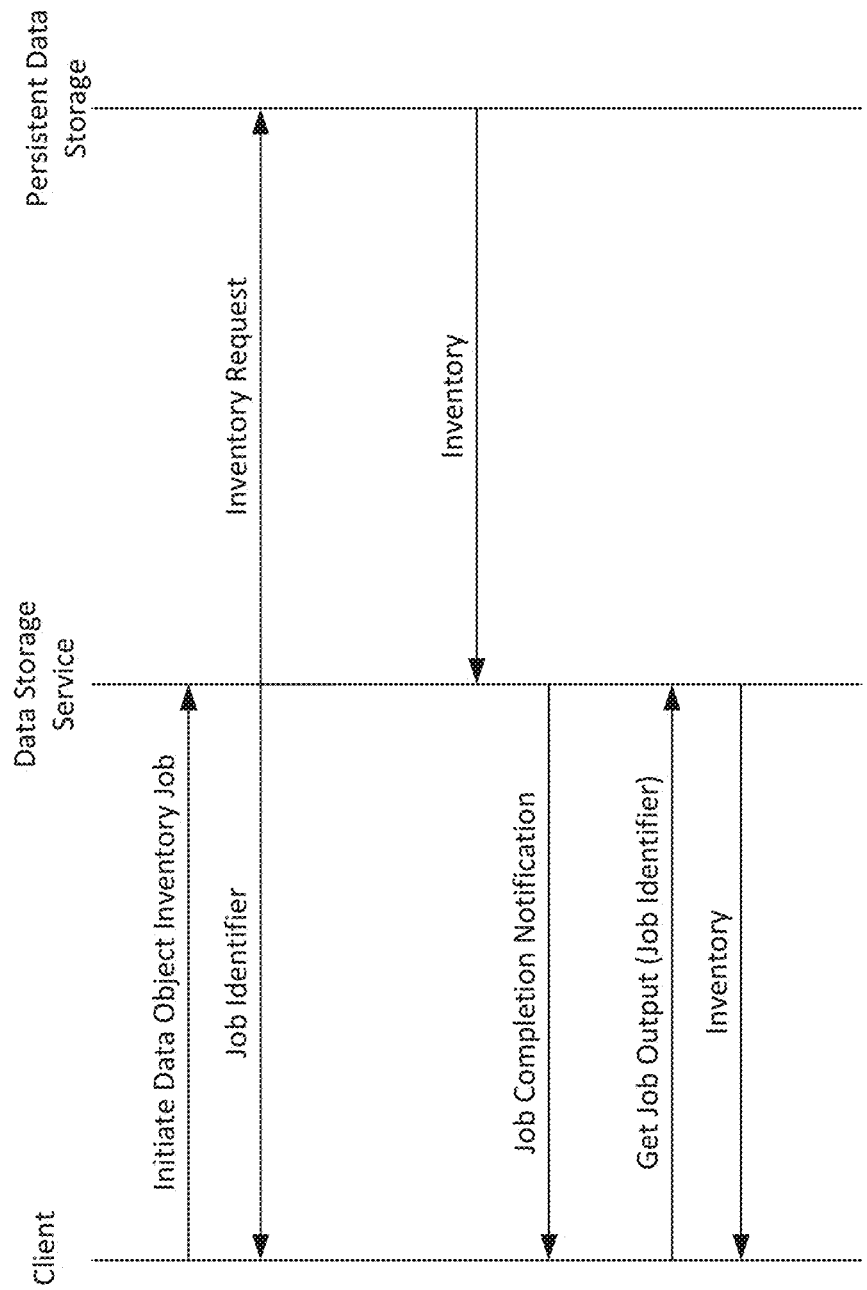
FIG. 14 illustrates a graphical representation of a process for using an API of a data storage service to obtain an inventory of data objects, in accordance with at least one embodiment.

FIG. 14 shows an illustrative example of an information flow diagram illustrating a manner in which a storage service API may be used in accordance with various embodiments. In particular, FIG. 14 shows a manner in which data may be obtained from a data storage service upon receipt of a notification, in accordance with an embodiment. In this particular example, a client, such as in FIGS. 12-13, initiates a data object inventory job by specifying in an API call a logical data container inventory. In response, such as described above, a job identifier is generated and transmitted to the client form the data storage service. Also, an inventory request to a subsystem of the data storage service is submitted by the data storage service. The data storage service then, in an embodiment, processes the inventory request and, as part of a batch process, obtains an inventory of the data objects in the logical data container identified by the logical data container identifier specified by the client in the initiate job API call. As illustrated in FIG. 14, once obtained, a notification of completion of the job may be transmitted to the client and/or to another computer system, such as described above. As a variation, instead of or in addition to a notification, the client may poll the data storage service with the job identifier to check on the status of the job.

Figure 15:
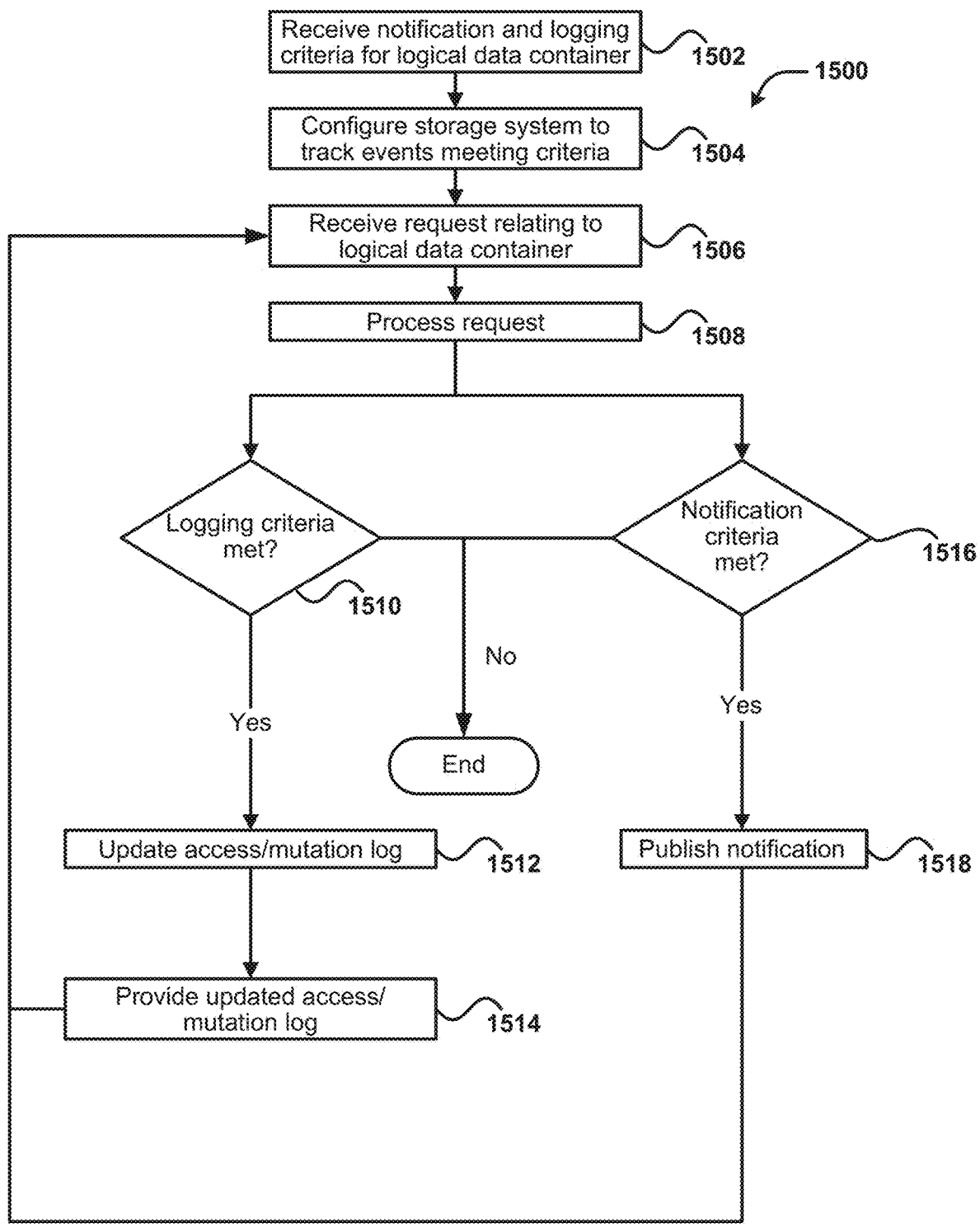
FIG. 15 illustrates a graphical representation of a process for using an API of a data storage service to obtain an access/mutation log, in accordance with at least one embodiment.

In accordance with various embodiments, storage services may provide advanced notification and/or logging functionality. FIG. 15 shows an illustrative example of a process 1500 for providing notification and/or logging functionality in accordance with an embodiment. As shown herein, the process 1500 includes receiving notification and logging criteria 1502 for a logical data container. The notification and logging criteria may be provided in any suitable manner, such as through an appropriate API call. The criteria may specify conditions that, when met, trigger notifications. The criteria may also specify conditions that, when met, cause a storage service to update an access and/or mutation log (collectively referred to as an access/mutation log). Receiving the criteria may be performed by receiving the criteria in an API call or multiple API calls that collectively encode the criteria. An access/mutation log for a logical data container may be a collection of information, e.g. a table that encodes information about events that occur in connection with the logical data container. An access/mutation log may record events of access of a logical data container and may include information such as an Internet protocol (IP) address from which an access request was initiated, a user agent (e.g. browser or other application) made to submit the request, the type of request (e.g. read, write, delete, inventory, etc.) and a status code (e.g. a code indicating whether the request was successful and/or one or more reasons for failure). Other information that may be provided includes, but is not limited to, identity information of a user (e.g. username) that authorized access, timing information that specifies when a job started and/or ended, and operation that was performed, a resource operated upon (e.g. data object identifier of data object uploaded, job identifier of job that was cancelled, and the like), errors, accounting information (e.g. billing charges), and the like.

In an embodiment, a storage service generates a new access/mutation log for successive periods of time. For example, a new access/mutation log may be generated every 24 hours. Customers may submit API calls that specify parameters for maintaining access/mutation logs, such as the frequency at which they are generated and the types of events to be recorded. A customer may, for example, specify that write and deletion events should be recorded, but attempts to read data objects in a logical data container should not. Similarly, customers may specify conditions, such as the size of a mutated data object, that should be met before a record is added to an access/mutation log. Delivery of an access/mutation log to a customer may itself be recorded in an access/mutation log. In such an instance, to prevent an infinite loop, a delivery of the access/mutation log may be recorded in the access/mutation log before the access/mutation log is delivered. Further, customers may specify delivery parameters. Customers may, for example, specify that an access log should be delivered by calling an API of a customer on-premise web server, by email, and the like. In some embodiments, the storage service is part of a collection services of a computing resource provider. The customer may specify that the access/mutation logs should be sent to a computing resource (computer system, data store, etc.) of a different service, but programmatically managed by the customer.

Returning to FIG. 15, in an embodiment, in response to receipt of the notification and logging criteria, the storage system is configured 1504 to provide notifications and to update access/mutation logs according to the received criteria. For example, one or more servers monitoring events may be reconfigured to cause notifications and access/mutation log events to occur when satisfaction of the criteria is detected.

At some point, the data storage service may receive 1506 a request relating to a logical data container, such as a request submitted according to an API call such as described above. The request may be processed 1508, such as described above in connection with FIGS. 2-7. A determination may be made 1510 whether the criteria for logging are met and, if it is determined that the logging criteria are met, an appropriate access/mutation log may be updated 1512 and the updated access/mutation log may be provided 1514, such as according to customer specifications. In addition, in an embodiment, a determination may be made 1516 whether criteria for notifications are met. If it is determined that the criteria for notifications are met, the notification may be published 1518, such as described above. While drawn as separate actions in performed in parallel for the purpose of illustration, it should be noted that determinations whether criteria for logging and notifications may be made in a different sequence or as part of the same operation in various embodiments and the process 1500 may be modified accordingly. The actions of receiving requests, processing requests, publishing notifications and updating access/mutation logs may repeat until the updated access/log is provided at a customer-specified time. For example, the customer may have specified that an access/mutation log be provided every 24 hours and/or when the access/mutation log meets customer-specified conditions, such as by exceeding a threshold number of mutations and/or a threshold of data affected by access, and the like.

It should be noted that the various parameters of API calls illustrated and described above are for the purpose of illustration and that numerous variations are considered as being within the scope of the present disclosure. For example, while not illustrated as such, API calls may include additional information not explicitly shown. As an example, an API call may include a host identifier. As another example, API calls may include electronic signatures, such as electronic signatures of the requests made. Electronic signatures may be used by a data storage system to ensure that the request was made by a requestor with authority for the requested action. For example, an authentication system (which may be a sub-system of the data storage system) may compare a received signature with an expected signature to determine if the request was validly made. The request may be fulfilled or denied based at least in part on whether the received signature matches the expected signature.

In addition, API calls made in accordance with the various embodiments may have common parameters (e.g. request headers for REST requests). As an example, API calls may, in addition to information described above, include authorization information, such as a digital signature of the request, a content length (which may be the length of a body of a REST request), a timestamp, a host (endpoint to which the request is sent), a checksum of a payload, a signature timestamp, and an API version being used.

Figure 16:
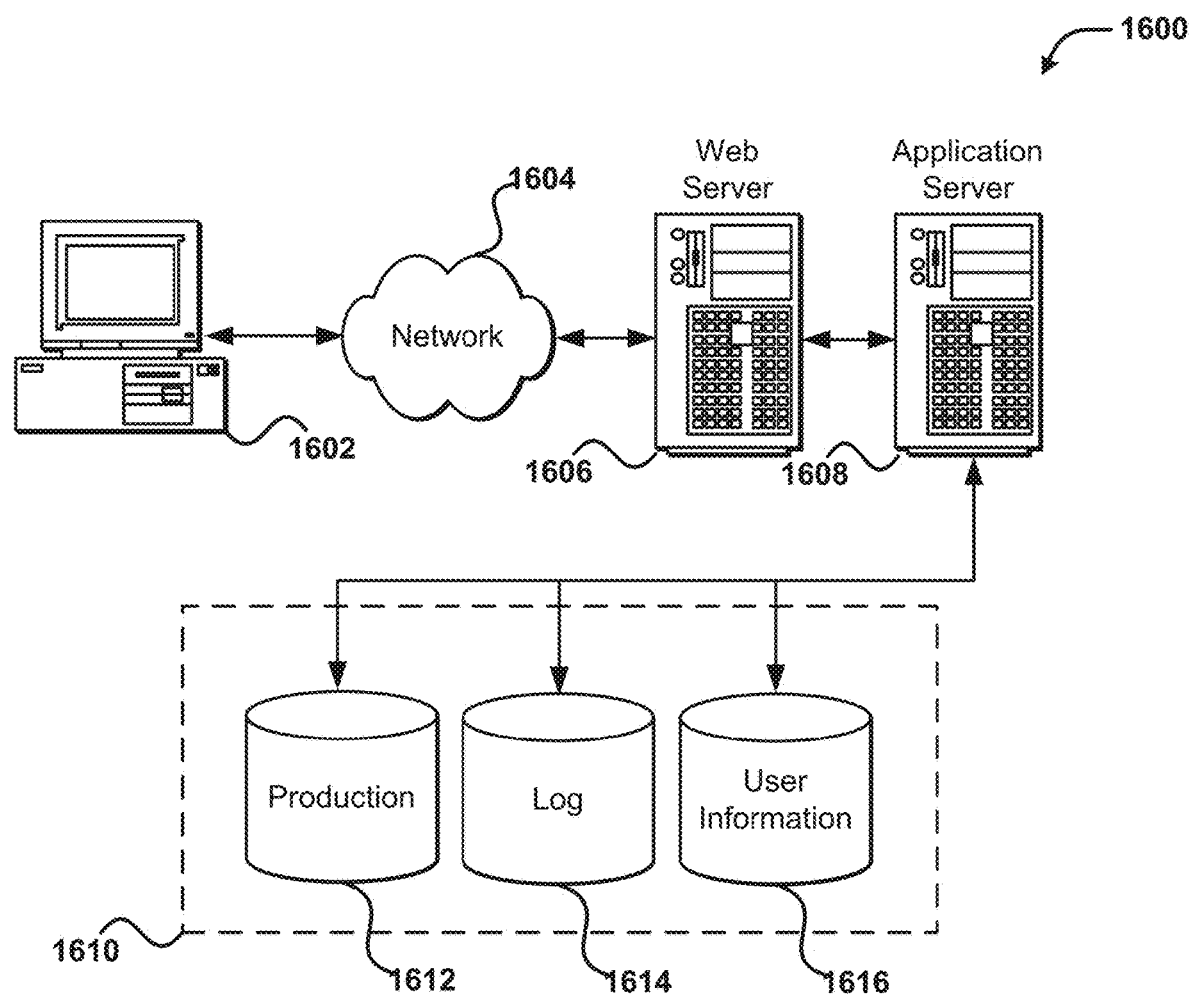
FIG. 16 illustrates an environment in which various embodiments can be implemented.

FIG. 16 illustrates aspects of an example environment 1600 for implementing aspects in accordance with various embodiments. As will be appreciated, although a Web-based environment is used for purposes of explanation, different environments may be used, as appropriate, to implement various embodiments. The environment includes an electronic client device 1602, which can include any appropriate device operable to send and receive requests, messages or information over an appropriate network 1604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1606 for receiving requests and serving content in response thereto, although for other networks an alternative device serving a similar purpose could be used as would be apparent to one of ordinary skill in the art.

The illustrative environment includes at least one application server 1608 and a data store 1610. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1602 and the application server 1608, can be handled by the Web server. It should be understood that the Web and application servers are not required and are merely example components, as structured code discussed herein can be executed on any appropriate device or host machine as discussed elsewhere herein.

The data store 1610 can include several separate data tables, databases or other data storage mechanisms and media for storing data relating to a particular aspect. For example, the data store illustrated includes mechanisms for storing production data 1612 and user information 1616, which can be used to serve content for the production side. The data store also is shown to include a mechanism for storing log data 1614, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1610. The data store 1610 is operable, through logic associated therewith, to receive instructions from the application server 1608 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 1602. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the system 1600 in FIG. 16 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for an archival data storage system, comprising:
  under the control of one or more computer systems of an archival data storage system:
    receiving a retrieval request to retrieve a data object from persistent storage, where at least a portion of the data object is encoded based at least in part on a data encoding scheme to generate a set of encoded data components stored in individual data volume components of a set of data volume components, the retrieval request generating a data object identifier associated with the data object;
    initiating a retrieval job to obtain the set of encoded data components from the set of data volume components in response to the retrieval request;
    providing, to a computer system associated with the retrieval request, a retrieval job identifier associated with the retrieval job, where the retrieval job identifier comprises information that enables, when included in a status request, the computer system to provide status information associated with the retrieval job and, when included in a download request, to provide the data object;

erasure decoding the set of encoded data components to form a set of decoded data components;

combining the set of decoded data components to obtain the data object;

performing a data integrity check on the data object using payload integrity validation information encoded in the data object identifier;

receiving the download request encoding the retrieval job identifier; and providing the data object for download in response to the download request.

2. The computer-implemented method of claim 1, further comprising:

receiving a status request encoding the retrieval job identifier; and providing a current status of the retrieval job in response to the status request.

3. The computer-implemented method of claim 1, wherein:

the download request includes information indicating a particular portion of the data object; and providing the data object for download includes providing the particular portion of the data object.

4. The computer-implemented method of claim 3, wherein providing the particular portion of the data object further comprises providing a data verification value for the particular portion, where the data verification value usable to determine whether, when downloaded, the particular portion is corrupted.

5. The computer-implemented method of claim 1, wherein the data encoding scheme is a redundancy coding scheme.

6. A system comprising:

one or more processors; and memory with instructions that, as a result of being executed by the one or more processors, cause the system to:

receive a first request including a first identifier associated with a data object maintained by a storage system, where at least a portion of the data object is encoded based at least in part on a data encoding scheme to generate a set of encoded data components, wherein an encoded data component of the set of encoded data components is stored in a data volume component of a set of data volume components;

initiate a job to retrieve the set of encoded data components from the set of data volume components;

receive a second request including a second identifier, where the second identifier is associated with the job and, when included in the second request, causes the system to provide information associated with the job;

provide information associated with the job in response to the second request;

erasure decode the set of encoded data components to form a set of decoded data components;

combine the set of decoded data components to obtain the data object;

perform a data integrity check on the data object using payload integrity validation information encoded in the first identifier;

receive a third request including the second identifier, where the second identifier is further to, when included in the third request, cause the system to provide the data object; and provide the data object in response to the third request.

7. The system of claim 6, wherein the first identifier and the second identifier are different.

8. The system of claim 6, wherein the memory further includes instructions that, as a result of being executed by the one or more processors cause the system to, as a result of the second request including a notification parameter, provide a notification upon completion of the job prior to receiving the third request.

9. The system of claim 6, wherein providing the data object further comprises copying at least a portion of the data object to a storage device of the storage system accessible to an entity associated with the first request.

10. The system of claim 6, wherein:

the data object is associated with a logical data container; and the first identifier is an identifier for the logical data container.

11. The system of claim 6, wherein providing information associated with the job further comprises providing a status of the job.

12. The system of claim 6, wherein providing information associated with the job further comprises providing a log of one or more actions performed in connection with the data object.

13. The system of claim 6, wherein:

the first request originated from a customer computer system of a customer of the storage system;

the first request includes metadata provided by the customer computer system; and the information associated with the job includes at least a portion of the metadata.

14. A non-transitory computer-readable storage medium storing thereon instructions that, as a result of being executed by one or more processors of a computer system, cause the computer system to:

receive a first electronic message comprising a first identifier corresponding to data stored by a storage system, where at least a portion of the data is encoded based at least in part on a data encoding scheme to generate a set of encoded data components stored in individual data volume components of a set of data volume components;

initiate a job in connection with the set of encoded data components, where a second identifier is associated with the job and useable to retrieve information associated with the job and the data stored by the storage system;

erasure decode the set of encoded data components to form a set of decoded data components;

combine the set of decoded data components to obtain the data;

perform a data integrity check on the data using payload integrity validation information encoded in the first identifier;

receive a second electronic message comprising the second identifier;

as a result of receipt of the second electronic message, determine the data stored by the storage system is associated with the job; and provide the data stored by the storage system.

15. The non-transitory computer-readable storage medium of claim 14, wherein the first identifier and the second identifier are different.

16. The non-transitory computer-readable storage medium of claim 14, wherein:

the data comprises one or more data objects associated with a logical data container; and the first identifier identifies the logical data container.

17. The non-transitory computer-readable storage medium of claim 16, wherein the instructions further comprise instructions that, as a result of being executed by the one or more processors, cause the computer system to:

receive a third electronic message comprising the second identifier; and provide, in response to the third electronic message, information associated with the job, where the information associated with the job includes a collection of one or more identifiers that each identifies at least one of the one or more data objects.

18. The non-transitory computer-readable storage medium of claim 16, wherein:

the first electronic message originated from a customer computer system of a customer of the storage system;

the first electronic message includes metadata provided by the customer computer system; and the information associated with the job includes at least a portion of the metadata.

19. The non-transitory computer-readable storage medium of claim 18, wherein the instructions that cause the computer system to provide the data stored by the computer system further include instructions that cause the computer system to provide the data stored by the storage system by at least creating a copy of the data stored by the storage system on a second storage device of the storage system accessible to the customer computer system.

20. The non-transitory computer-readable storage medium of claim 19, wherein the information associated with the job indicates whether the copy of the data stored by the storage system has been stored in the second storage device of the storage system.

21. The non-transitory computer-readable storage medium of claim 14, wherein the instructions, as a result of being executed by the one or more processors, cause the computer system to provide a notification of completion of the job.

* * * * *